(12) United States Patent
Hall et al.

(10) Patent No.: US 7,864,757 B2
(45) Date of Patent: Jan. 4, 2011

(54) PACKET SWITCHING

(75) Inventors: Trevor James Hall, Manotick (CA);
William Alden Crossland, Harlow (GB)

(73) Assignee: Cambridge University Technical Services Limited, Cambridgeshire (GB)

( * ) Notice: Subject to any disclaimer, the term of this patent is extended or adjusted under 35 U.S.C. 154(b) by 1229 days.

(21) Appl. No.: 10/511,613

(22) PCT Filed: Apr. 16, 2003

(86) PCT No.: PCT/GB03/01690

§ 371 (c)(1),
(2), (4) Date: Jun. 7, 2005

(87) PCT Pub. No.: WO03/090416

PCT Pub. Date: Oct. 30, 2003

(65) Prior Publication Data

US 2006/0165070 A1    Jul. 27, 2006

(30) Foreign Application Priority Data

Apr. 17, 2002 (GB) ................. 0208797.1

(51) Int. Cl.
*H04L 12/50* (2006.01)
*H04L 12/28* (2006.01)
*H04L 12/56* (2006.01)
*H04Q 11/00* (2006.01)
*H04L 12/54* (2006.01)

(52) U.S. Cl. .................. 370/388; 370/395.4

(58) Field of Classification Search .......... None
See application file for complete search history.

(56) References Cited

U.S. PATENT DOCUMENTS 6,072,772 A    6/2000  Pattabhiraman et al.

(Continued)

FOREIGN PATENT DOCUMENTS

GB    2357656 A    6/2001

(Continued)

OTHER PUBLICATIONS

Wilmsen, C. W., et al., "Vertical Cavity Surface Emitting Laser Based Optoelectronic Asynchronous Transfer Mode Switch," *Optical Engineering, Soc. of Photo-Optical Instrumentation Engineers*, vol. 38, No. 7, pp. 1216-1222 (Jul. 1999).

(Continued)

*Primary Examiner*—Daniel J Ryman
*Assistant Examiner*—Christopher Crutchfield
(74) *Attorney, Agent, or Firm*—Hamilton, Brook, Smith & Reynolds, P.C.

(57) ABSTRACT

A packet switch having plural input sectors and output sectors, each input sector being arranged to hold at least one queue per output sector, each output sector having plural output ports and being arranged to hold at least one queue per output port wherein the input sectors are connected to the output sectors via links configured to afford speed-up of data transfer, wherein the links comprise a set of links, and wherein the switch has means for cyclically connecting different subsets of the set of links between the input sectors and the output sectors, and means responsive to statistical variations in traffic applied to input ports of said input sectors to vary the set of links.

27 Claims, 21 Drawing Sheets

U.S. PATENT DOCUMENTS

| | | | | |
|---|---|---|---|---|
| 6,665,495 | B1* | 12/2003 | Miles et al. | 398/54 |
| 6,934,471 | B1* | 8/2005 | Carvey et al. | 398/45 |
| 6,961,342 | B1* | 11/2005 | Uzun et al. | 370/414 |
| 6,993,018 | B1* | 1/2006 | Horlin et al. | 370/382 |
| 2001/0050916 | A1* | 12/2001 | Krishna et al. | 370/419 |
| 2002/0027902 | A1* | 3/2002 | Reeve et al. | 370/355 |

FOREIGN PATENT DOCUMENTS

| | | |
|---|---|---|
| WO | WO 00/76256 A1 | 12/2000 |
| WO | WO 02/15633 A2 | 2/2002 |

OTHER PUBLICATIONS

Nakai, K., et al., "Scalable 3-Stage ATM Switch Architecture Using Optical WDM Grouped Links Based on Dynamic Bandwidth Sharing," *IEICE Transactions on Electronics*, Institute of Electronics Information and Comm. Eng., Tokyo, JP, vol. E82-C, No. 2, pp. 213-218 (Feb. 1999).

Manoj, Kumar, et al., "Performance Enhancement in Buffered Delta Networks Using Crossbar Switches and Multiple Links," *Journal of Parallel and Distributed Computing*, vol. 1, No. 1, pp. 81-103 (Aug. 1, 1984).

\* cited by examiner

PACKET SWITCHING

RELATED APPLICATIONS

This application is the U.S. National Stage of International Application No. PCT/GB03/01690, filed Apr. 16, 2003, published in English, and claims priority under 35 U.S.C. §119 or 365 to Great Britain Application No. 0208797.1, filed Apr. 17, 2002.

The present invention relates to a packet switch, a line card interface, to a method of interfacing, to a method of routing packets to a routing device and to a device for providing balanced traffic.

As used herein the term 'packet' refers to a fixed length cell (ATM cell or convenient sized segment of a variable length IP packet) with a pre-pended local header.

A traffic matrix is a matrix with elements that specify the capacity between each traffic source-traffic sink pair required to carry the offered traffic. In the specific example discussed, the overall number of input ports are divided up into groups, each consisting of plural input ports, each group having access to a respective store, and each store having a plurality of outputs. The group is referred to as a sector, and the switch is referred to as sectored. Again the specific example discussed uses intersector queues, and the relevant traffic matrix is the intersector traffic matrix where the traffic sources are identified with input sectors and the traffic sinks are identified with output sectors. The intersector traffic matrix may be constructed from the full traffic matrix that describes the inter-port traffic by summing up over entries corresponding to the same input sector—output sector.

It has entries that give the average number of packets that both arrive at input sector i and are destined for output sector j in a time slot. It therefore gives the arrival rate in units of per time slot on the input-sector intersector queue labelled by (i, j). It may be thought of alternatively as an 'arrival matrix'.

An allied concept used herein is that of the service matrix, which in the described embodiment specifies the rate at which these queues are served. Another term might be 'departure matrix'.

Herein the terms "distributor" and "demultiplexer" are used to signify similar devices, according to the context and function performed. As used herein the term "deserialiser" is used to define a device having similarity to a demultiplexer, but with the function of converting bit-serial data at one rate into bit-parallel data at a lower rate, while conserving the overall bit rate. The term "serialiser" is used to define a device that converts bit-parallel data into faster bit serial data, with the overall input and output bit rates conserved.

In the switches considered in this document, it is convenient to combine multiplexing with deserialisation by time-dividing bus access between multiple deserialisers to limit the bit rate on each line of the bus despite the increased aggregate bit rate caused by the multiplexing.

Conversely it is convenient to combine demultiplexing with serialisers, so high aggregate capacity traffic on an incoming bus may be 'distributed' to several outgoing serial lines. The high aggregate capacity required to keep many serial lines busy is therefore achieved without increasing the speed of the electrical lines by conveying data as bit-parallel words over the many lines that compose the bus.

The size of the word is a design parameter with an upper limit equal to the cell size. For efficiency the cell size should not be too much greater than the minimum packet size encountered. A practical choice that accommodates IP packet size distributions is 512 bits, since that can also accommodate the 53 byte ATM cell. The width of the memory available is also a consideration.

The Internet is a communications network than conveys information in the form of packets having a payload of data having a header. The header contains the destination host address amongst other information about the packet.

Router switches are normally devices having a number of input ports and a number of output ports, with the ability to provide paths between each input port and each output port. It is known, for example where a number of routing switches form a network, to provide a centralised control device which chooses the route that data will follow on a path between a network input and a network output. Such a control device can then remedy so-called "hot-spots" where congestion is occurring or is likely to occur, for example by adopting a routing that avoids the hot spot. It is also known to provide a routing switch with its own local control device, for setting the configuration of the router to cope with instantaneous traffic conditions.

Optical communications links are now capable of carrying data at 40 Gbit/s on a single channel The use of wavelength division multiplexing (WDM) can easily provide more than 100 channels, giving an aggregate capacity of over 1 Tbit/s on a single fibre. The use of Vertical Cavity Semiconductor Lasers (VCSELs) and plastic fibre ribbons, offers capacities of 2 Gbit/s per fibre and 32 Gbit/s per link (ribbon) at a price which is affordable at the level of the local area network (LAN).

To turn this raw bandwidth into usable network infrastructure, a new generation of multi-terabit router switches is required. Multi-terabit capacities usually arise either because the router switch requires a very large number of modest capacity ports (i.e. an access node at the edge of the network) or because it has a modest number of very high capacity ports (i.e. a super-router in the core of the network). Router switches are located at the nodes of a network and are required to forward data packets received on incoming links to the correct outgoing links. The traditional use of software running on high performance servers or specialised centralised CPU architectures is now the cause of a severe bottleneck in the network.

Typically, variable length incoming packets are fragmented into convenient fixed size cells. These cells consist of a data payload having a routing tag. The routing tag contains the destination port address. The contents of the routing tag are determined from the packet header via a routing-table look-up. This table is updated and maintained by the network layer processes, typically running in software.

A cell is, in essence, a fixed length packet with a local header. It is assumed the core switch of a router operates in a time slotted fashion where the duration of the time slot is equal to the duration of a cell and those cells on different ports are temporally aligned.

It is fundamental that more than one packet arriving in the same time slot may contend for the same output port. Since only one packet can depart from that output port in a time slot, it is necessary to store packets within a switch whilst they wait for their destination port to become free. Hence the core switch has a circuit switch setting a path between input port and output port, and buffer storage storing packets waiting in accordance with a suitable queuing discipline. The requirement to store packets defines a key decision point when considering the scope for optoelectronic implementation. There is currently no practical optical memory. So-called "almost all-optical" packet switches therefore use delay lines as buffers. These are limited in terms of numbers of buffers and buffer depth, although advantage can be taken of WDM technology to share buffers between packets on different wavelengths. Another strategy is to use 'mad postman' or 'hot potato' routing where a packet that cannot be output on the correct port is output on any otherwise idle port. The idea here is that eventually the packet will be correctly routed at other nodes.

Effectively, all these buffering strategies are some form of deflection: in time, in wavelength, or in space, i.e. buffer memory/delay lines re-order packets in time; wavelength conversion re-orders packets in wavelength, a space switch operating as a mad postman re-orders packets in space.

To address the need to develop a new generation of routers, a family of modular 'core switch' architectures has been conceived. The form of the architectures is influenced by the following observations:

Historically the emphasis in switch design has been on the minimisation of crosspoints and buffers. This leads to the use of multistage switches and the avoidance of buffering strategies that scale as the square of the number of ports. The low cost of electronic memory means that this is no longer an issue and switches with a minimum of stages are now practical.

Short interconnections with localised fan-out or fan-in are better implemented electronically. Long interconnections with large numbers of crossovers are better implemented optically.

Optical switches have the advantage of transparency that permits high-rate and format-independent transmission but are relatively slow to reconfigure and difficult to buffer. Electronic switches are opaque but offer fast switching and extensive buffering.

Whilst the number of optoelectronic interfaces is a significant factor in the cost, the development of high density optical interconnect technology, for example based on VCSELs, is driving cost down justifying the greater use of optical pathways to enhance packet switch performance.

The architectures that emerge have 'electronic islands' of common structure interconnected by fixed or reconfigurable optical pathways. The various different architectures differ in their precise configuration and control, both of which are essentially a matter of software.

Larger switches may be built from a network of basic switch modules. There are compelling reasons to make this network reconfigurable and so the same architecture emerges with the modules now replacing the 'electronic islands'.

Intriguingly the core network is evolving towards a structure in which routers surround an ideally non-blocking circuit-switched core that also logically has the same structure. Furthermore, an Internet Service Provider (ISP), although logically appearing as a node in the network, uses networks of smaller routers. The ISPs are finding it necessary to increase the connectivity of their internal networks in order to handle increasing local traffic. (Content providers are placing their servers close to the ISP. There is also local caching of remote content). Making this internal network reconfigurable would allow the ISP to adapt to different traffic patterns by re-allocation of its resources. Again the same structure emerges.

A network topology may thus be envisaged that is self-similar at all levels of aggregation: chip, router, ISP, core network. There appear to be connections between this observation and the recent discoveries that the Internet appears scale-less as a directed graph and that Internet traffic appears to obey self-similar statistics.

Disclosed herein are switches in which packets are stored in queues at a location in the switch, with the particular queue of concern being selected according to the desired output from the switch for the packet of concern. The "switching" operation of such switches can be viewed as having taken place at the instant the packets are allocated to a particular queue. Once that allocation has taken place, the switch operates in such a way that the packet inevitably appears at the relevant output port.

According to one aspect of the invention there is provided a packet switch having plural input sectors and output sectors, each input sector being arranged to hold at least one queue per output sector, each output sector having plural output ports and being arranged to hold at least one queue per output port wherein the input sectors are connected to the output sectors via links configured to afford speed up of data transfer, wherein the links comprise a set of links, and wherein the switch has means for cyclically connecting different subsets of the set of links between the input sectors and the output sectors, and means responsive to statistical variations in traffic applied to input ports of said input sectors to vary the set of links.

Each input sector may be arranged to hold one queue per output of the output sectors to provide virtual output queuing (VOQ).

Each input sector may be arranged to hold only one queue per output sector.

The packet switch may have plural input sectors and output sectors, each input sector have an input sector memory and plural input ports, each port be arranged to receive packet data, the input sector memory be arranged to store plural input queues of packet data from said input ports, at least one said input queue corresponding to each respective output sector, the input sector memory have a respective output for each said input queue, each output sector have an output sector memory and plural output ports; the output sector memory be arranged to store plural output queues and having plural inputs for packet data and being arranged to pass packet data to a respective output port, the packet switch further have a population of links and a control device; wherein said population comprises plural links for carrying packet data between outputs of the input sector memory and inputs of the output sector memory, and wherein the control device is operable to form a selection of links from said population to provide speed-up, and thereby enable packet data transfer between said outputs and inputs using said selection of links and the control device being further operable to vary said selection to cope with changing traffic conditions.

Each input sector memory may be arranged to store one input queue per input port of the sector for each output port of the switch.

Each output sector memory may be arranged to store one output queue per output port of the sector for each input port of the switch.

Each input sector memory may be arranged to store a single output queue per output sector for each input port of the switch.

Each output sector memory may be arranged to store a single output queue per output port of the sector.

Each link may have a higher packet rate than the line rate of packet flow at switch input ports to provide said speed-up.

Each link may have a similar packet rate to the line rate of packet flow at switch input ports.

The control device may comprise a processor constructed and arranged to construct a service matrix having integer entries in units of the link rate and having row and column sums equal to the number of ports from each input sector and the ports of each output sector such that in said units of the internal link rate, each of said integer entries exceeds the corresponding entry in a desired traffic matrix, said matrix having elements formed by the said desired offered load at the switch inputs on the basis of each input and output port; and to decompose the service matrix into its constituent permutations thereby to control said links using said permutations.

According to a second aspect of the invention, there is provided a method of routing packets in a packet switch having plural input sectors and output sectors, each input sector being arranged to hold at least one queue per output sector, each output sector having plural output ports and being arranged to hold at least one queue per output port the method comprising: providing a set of links for connecting the or each input sector queue to respective output sector queues, connecting at least some input sector queues to respective output sector queues using a subset of said set of links, said subset affording speed-up of data transfer, and cyclically selecting different subsets of the set of links between the input sectors and the output sectors.

The method may comprise determining statistical variations in traffic applied to input ports of said input sectors and in response thereto vary the set of links.

The determining step may comprise monitoring input queue states.

The determining step may comprise monitoring input packet arrivals.

The providing step may comprise constructing a service matrix having integer entries in units of the internal link rate and having row and column sums equal to the number of ports from each input sector and the ports of each output sector such that, in said units of the internal link rate, each of said integer entries exceeds the corresponding entry in a desired traffic matrix, said desired traffic matrix having elements formed by the said desired offered load at the switch input ports on the basis of each input port and output port; decomposing the service matrix into its constituent permutations and controlling said links using said permutations.

According to a further aspect of the invention, there is provided a line card interface device having plural optical paths between a first set of ports and a second set of ports, each optical path having a controllable shutter operable to enable or disable its path, the device further having means for selecting a set of said optical paths and means for cyclically connecting different subsets of the set of paths between the first and second set of ports.

The line card interface may have means responsive to statistical variations in traffic flow to the line cards for varying the set of optical paths.

According to yet another aspect of the invention there is provided a line card interface device, in use interfacing between plural line cards of a digital data transmission network carrying non-balanced packet traffic at a given line rate, said traffic having a statistical distribution which varies at a given variation rate, the interface device comprising an optical selector and a control device, the optical selector having plural interface inputs for connection to a first multi-path optical connection, plural interface outputs for connection to a second multi-path optical connection, and plural optical paths connecting the interface inputs to the interface outputs, wherein the optical paths allow transfer of more packets per unit time than are incident per unit time at the plural interface inputs, thereby providing speed-up, the optical selector further having a respective optical switch per path, each optical switch having a control input and responsive to control signals at the control input, the speed of response being substantially less than said line rate, each said optical switch having a first state in which it enables its path and a second state in which it disables its path, and the control device having means for applying control signals to the switch control inputs at a rate corresponding to the rate of statistical variation in traffic distribution.

The line card interface may thus operate on a slow basis, thus enabling the use of switching devices incapable of high speed operation. The control device does not have to carry out fast scheduler calculations, and the interface may have very low power dissipation.

Advantageously the optical paths are spatially distinct and are greater in number than the number of the plural interface inputs to provide spatial speed-up.

Spatial speed-up may be achieved via optical means with relative ease. The value of speed-up for an N input switch may be relatively low in embodiments of the invention, while retaining non-blocking behaviour.

The interface inputs and outputs may be sectored to reduce memory access contention, by dividing into input groups and output groups, each input group having a distributor, said distributor having one or more of said interface inputs and plural outputs, each output group having a multiplexer having an input, one or more interface outputs, and the optical paths comprise an optical connection wherein each input group is connectable to each output group.

In embodiments, each input group has a respective input group memory, said distributor having plural outputs for writing to said input group memory and each output group has a respective output group memory, said multiplexer input being connected to receive outputs from said output group memory.

In some embodiments, the optical connection comprises an optical fibre device.

In others, the optical connection comprises optical components providing free-space paths in use.

Advantageous embodiments have each input group with the same number of inputs as the outputs of the output groups.

Each memory may be a dual-port memory having an input port for writing to the memory and an output port for reading from the memory. This further reduces contention.

There may be provided latching circuitry for storing packet data prior to application to said multi-path optical connections whereby said multi-path optical connections have a line rate reduced compared to said line rate.

According to a still further aspect of the invention there is provided a method of interfacing between the optical inputs and optical outputs of plural line cards of a digital data transmission network carrying non-balanced packet traffic at a given line rate, said traffic having a statistical variation, the method comprising selecting between plural optical paths to provide a set of links between said optical inputs and optical outputs, the plural optical paths extending between the plural outputs of each line card and the plural optical inputs of each other line card, wherein said paths allow transfer of more packets per unit time than are incident per unit time at the plural interface inputs, thereby providing speed-up; varying said selection at a rate corresponding to the rate of statistical variation in traffic distribution.

The interface inputs and outputs may be divided into input groups and output groups, each input group having a distributor, one or more interface inputs and a plurality of outputs, each output group having a multiplexer, one or more interface outputs and said plurality of inputs, and the optical paths comprise an optical transpose connection wherein each input group is connectable to each output group.

Said step of varying may comprise: providing a desired traffic matrix; constructing a service matrix with integer entries in units of the internal link rate and that has row and column sums equal to the said plurality is constructed such that in these units each of its entries exceeds the corresponding entry in the desired traffic matrix; decomposing the service matrix into its constituent permutations and controlling said links using said permutations.

Such an algorithm is readily automated and carried out at slow speeds.

The constructing step may comprise calculating the nearest integer greater than each entry of the traffic matrix represented in units of the line rate and then incrementing the entries with the least excess service rate until the matrix satisfies the row and column sums requirement.

An especially simple solution is where the plurality is a power of two.

The matrix may be calculated, predefined or estimated from information derived from queues at said line card inputs or outputs.

According to another aspect of the invention, there is provided a routing device to balance packet traffic, the device having a first plurality of input ports and a first plurality of output ports, packet traffic being incident at said input ports, the device comprising a first-third stages in series, the first and third stages each having said plurality of deserialisers, said plurality of multiplexers, and a fixed transpose connection, each deserialiser having at least one input and said plurality of outputs, said at least one input forming a respective one of said input ports, each multiplexer having said plurality of inputs and at least one output, said at least one output forming a respective one of said output ports, and each fixed transpose connection connecting respective outputs of each deserialiser to a respective input of each multiplexer, and the second stage having said plurality of sets of packet data queues, each set of packet data queues comprising said plurality of queues, each set being disposed to receive data from a respective multiplexer of the first stage and to furnish data to a respective deserialiser of the third stage.

According to a further aspect of the invention there is provided a method of routing packet traffic using a device having a number of input ports and said number of output ports, the method comprising: applying packet traffic at said input ports, deserialising signals at each input port to provide first intermediate signals, said first intermediate signals being disposed in a group of said number of signals associated with each input port, whereby said number of groups is formed; transposing said first intermediate signals among said groups to provide transposed groups containing one first intermediate signal from each said group and multiplexing together the transposed groups of first intermediate signals, to provide said number of second intermediate signals; distributing said second intermediate signals among said number of queue storage locations according to the output port of the second intermediate signal; selecting data from said storage locations and serially outputting data from locations for sequential output ports; deserialising said serially output data to provide third intermediate signals, said third intermediate signals being disposed in a group of said number of signals, whereby said number of groups is formed; transposing said third intermediate signals among said groups to provide transposed groups containing one third intermediate signal from each said group and multiplexing together the transposed groups of third intermediate signals, to provide said number of output signals at said output ports.

The method may include latching packet data prior to said transposing step interface inputs whereby optical connections in said transposing steps have a line rate reduced compared to an external line rate.

Exemplary embodiments of the invention will now be described with reference to the accompanying drawings in which:

FIG. 10 shows a schematic diagram of a route-select switch with buffered fan-in;

In the various figures, like reference numerals refer to like parts.

Figure 1:
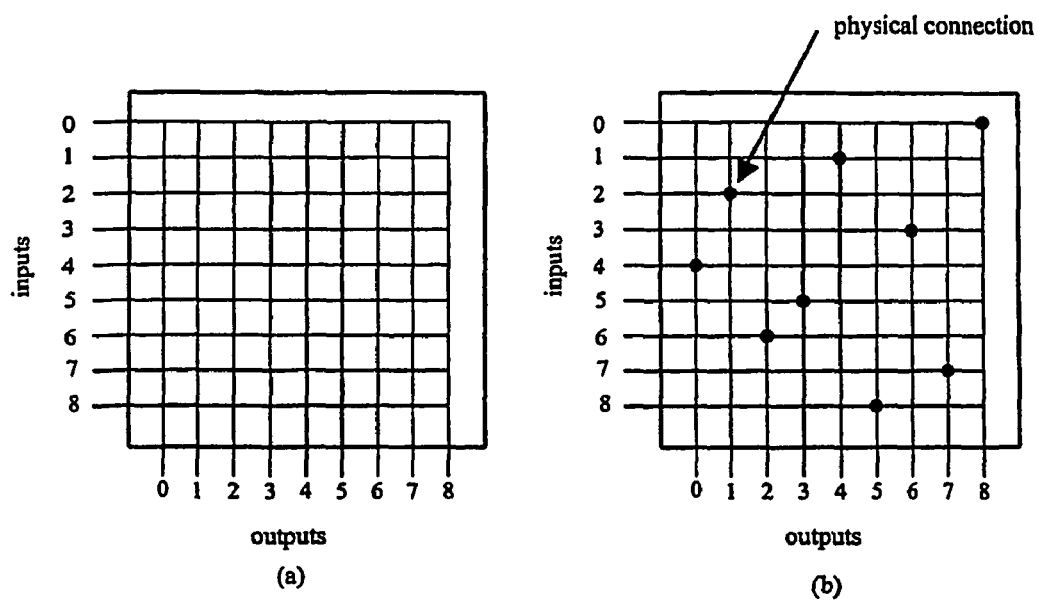
FIG. 1(a) shows a schematic diagram of a crossbar with no connections.
FIG. 1(b) shows a schematic diagram 6f a crossbar with nine connections set up: (0,8), (1,4), (2,1), (3,6), (4,1), (5,3), (6,2), (7,7), (8,5)

Early packet routers were formed by a processor card and line interface cards plugged into a shared backplane. The need to access the processor through the backplane limited the throughput of such devices, and to mitigate this, a later packet router provided the processing device in the line card. Other routers include switched backplane routers.

Such devices are all-electronic, and this tends to limit capacity.

So-called "fourth generation" routers embody optical transmission for the first time. In these devices, connections from a switch core to line cards are via optical fibre links. Line cards in these routers are sophisticated devices capable of the rapid and complex processing operations needed to convey up to the order of 10 terabits per second, as needed for the Internet.

An undesirable feature of core switches of routers is the phenomenon of blocking. Blocking occurs where for example a packet is to be routed to an output of a router when that output is already carrying traffic. Blocking also occurs where a traffic-carrying link of the switch is required for carrying further traffic at the same time.

A known circuit topology for avoiding blocking in a switching network was evolved by Clos, albeit in the context of circuit switching. The Clos topology is normally a three stage switch, each stage consisting of crossbar modules. However a five-stage switch Clos switch may be constructed by substituting three-stage Clos switches for the crossbar modules of the centre stage of the original three-stage switch. This process may be iterated to form multi-stage switches. The current state of the art frequently refers to Clos-type switches, in the packet context Such switches use speed-up (sometimes known as internal line-rate escalation) which may be temporal, spectral (eg at different frequencies) [T J1] or spatial.

In a typical router, there are two circuit modules sandwiching a core switch, namely an input module and an output module. The input module contains input processing circuitry which receives the incoming packets at the line rate, the input processing circuitry containing a header recognition part which examines the packet header to decide the final port destination and creates a local header for use in the core switch, and the input processing circuitry also splits the incoming packets into segments of a fixed width selected according to some criterion, eg no greater than the memory width, and adds the local header to each segment before storing each segment in a buffer, for output to input ports of the core switch.

At the output of the core switch the output module contains output processing circuitry that collects the segments from the core switch and stores the segments in buffers. The output processing circuitry then reassembles the input packet after removing the local headers. The input module and output module may be part of the line card.

If in a timeslot at most N packets arrive at a stage but up to k*N packets can be transferred to following stages via an inter-stage interconnect, then the inter-stage interconnect has a speed-up of k. The speed-up may be provided in time, space or frequency (equivalently wavelength in the context of an optical interconnect) or by these in combination. In time, it is provided by running the links at sufficient speed (i.e. by transporting packets within sub-slots of a time-division-multiplex of the timeslot). In space it is provided by equipping the interconnected with a sufficient number of physical links (i.e. a space division multiplex of the inter-stage interconnect) and in frequency (wavelength) it is provided by a sufficient number of frequency (wavelength) channels within each physical link, i.e. by frequency-division-multiplexing, or equivalently wavelength division multiplexing.

In summary, if the interconnect has A physical links each carrying B frequency/wavelength channels each running at C packets per timeslot (i.e. there are C sub-slots), the speed-up is $k=A*B*C/N$. Equivalently there are $A*B*C=k*N$ logical links each transporting one packet per timeslot but these logical links may be implemented in a different number of physical links using time/space/frequency (wavelength) multiplexing techniques.

Extra flexibility is offered by the fact that packets may be transmitted as w-bit words using w channels in parallel, c.f. 30 Gbit/s VCSEL links employing fibre ribbons with 12 fibres each operating at 2.5 Gbit/s. In embodiments of the invention herein described bit serial (w=1) transmission is employed over physical links containing one wavelength channel operating at a speed of one packet per timeslot (the timeslot is then defined by the packet length divided by the bit-rate of the link)—but the invention is not restricted to this.

Output-Queued Switches

Figure 2:
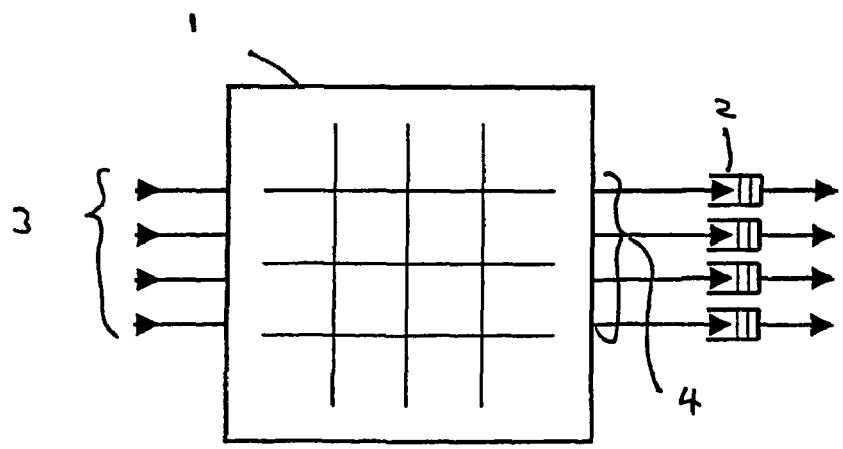
FIG. 2 shows a schematic diagram of an output-queued packet switch.

FIG. 1 shows a crossbar circuit switch, which logically comprises a set of nine row lines and an intersecting set of nine column lines with switching elements at every intersection. By turning on selected switches (see FIG. 1b) any desired connection regime may be provided. Referring to FIG. 2, a first type of packet switch is equivalent to a crossbar circuit switch 1 similar to that of FIG. 1 having row inputs 3 and column outputs 4, and equipped with buffer stores 2 at its output that queue packets for transmission. Such a switch is effective in that it may be implemented as work conserving, with 100% throughput, and with minimal packet wait times.

A disadvantage of many output-queued switches is that the switches operate N times faster than the line rate to avoid blocking, where N is the number of input ports. Non-blocking behaviour as a circuit switch, together with a time speed-up k defined by k=N prevents contention within the switch, even in the extreme case that all N packets at the input contend for the same output port.

Referring again to FIG. 1, it will be seen that each input (row) is distributed (fanned-out) to each crosspoint in a row. Conversely the outputs of each crosspoint in each column are combined (fanned-in) into each output.

Figure 3:
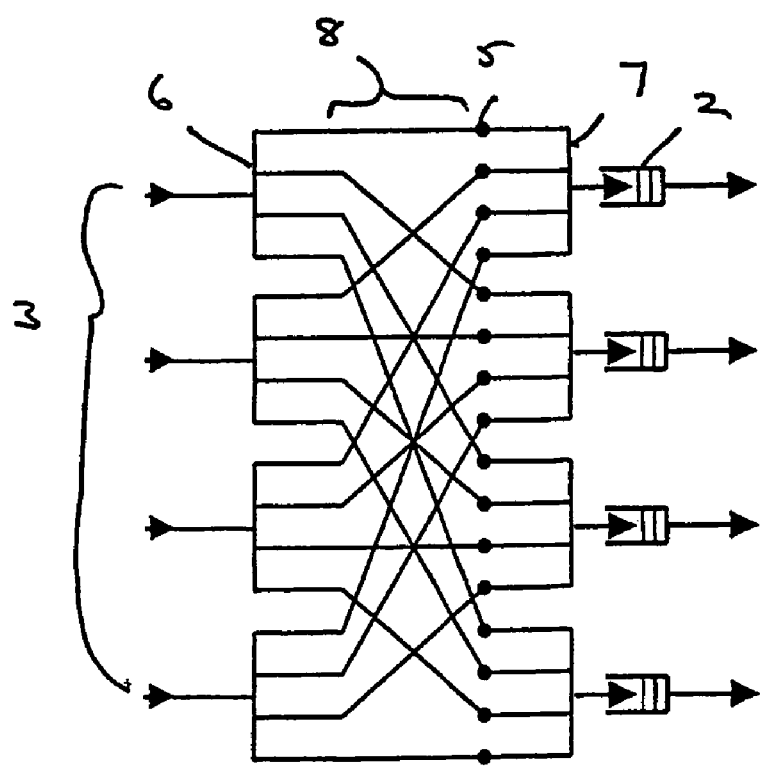
FIG. 3 shows a schematic diagram of an output-queued switch with fan-out, transpose interconnection, and fan-in into output buffers with the crosspoint switches shown as dots.

Referring to FIG. 3, the switch of FIG. 2 has been redrawn with the switches of the crossbar 1 shown as dots 5. The fan-out is shown as 6 and the fan-in as 7; the interconnection 8 between the fan-out and the fan-in (an interconnection in which each input is available to each output) is termed a transpose interconnection.

It is important to note that all paths are present in any physical implementation of a crossbar, electronic or optical. The paths that are unwanted are either not used (route and select switches) or are ignored (broadcast and select). Moreover optical fan-in typically requires the same area of photo-detector as the use of multiple photo-detectors and electronic fan-in. The silicon occupied by multiple receiver circuitry however is an issue. The important point is that sufficiently low cost opto-electronic interfaces exist. Moreover the fact that all optical pathways exist in any case favours the use of more transmitters/receivers and intelligent electronic fan-out/fan-in to avoid unnecessary contention.

Figure 4:
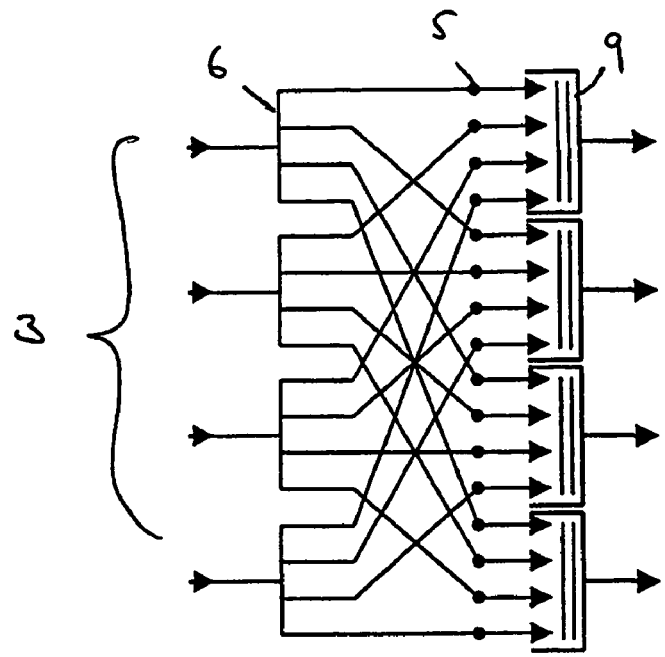
FIG. 4 shows a schematic diagram of a broadcast-select switch using buffered fan-in, with the crosspoint switches shown as dots.

The required speed-up can be alternatively achieved by replacing the simple fan-in with a following high speed buffer 2 by a multiple input buffer 9, as shown in FIG. 4.

Figure 5:
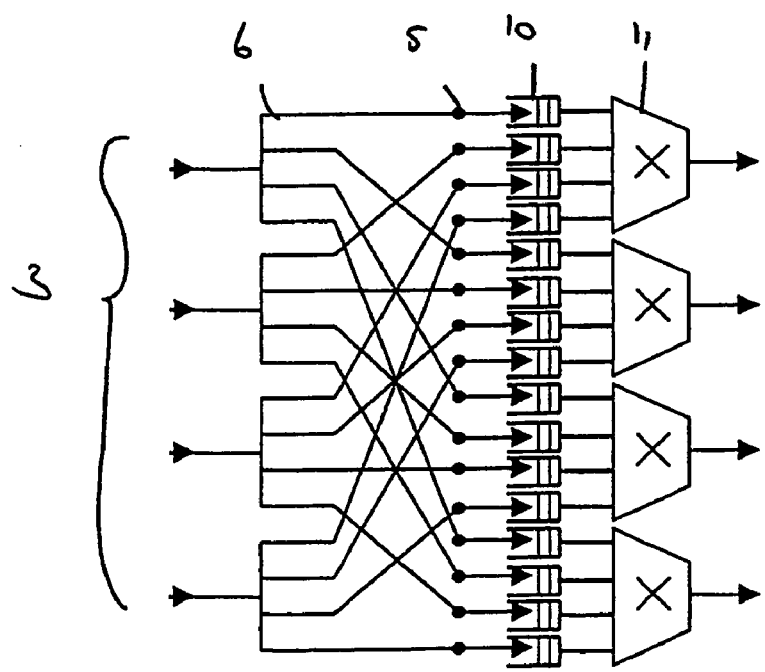
FIG. 5 shows a schematic diagram of a broadcast-select switch having crosspoint buffered fan-in, with the crosspoint switches shown as dots.

A multiple input buffer may be implemented as several single input buffers 10 followed by a multiplexer switch 11 appropriately controlled to emulate a single queue as shown in FIG. 5. This is as a switch using crosspoint buffers, and the technique is herein referred to as virtual input queuing (VIQ) since a queue for each input is being maintained at each output.

Figure 6:
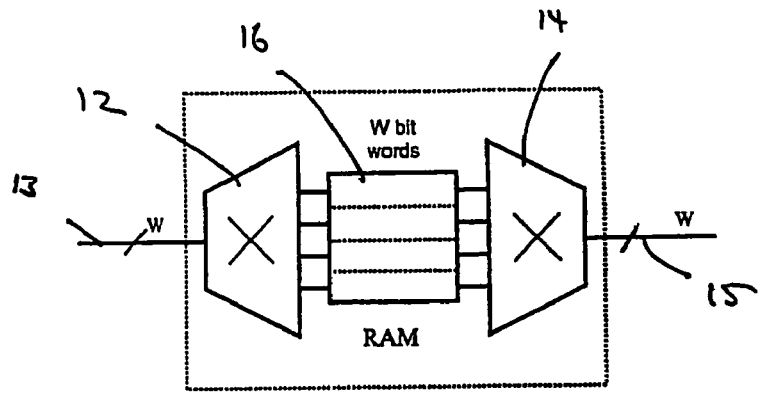
FIG. 6 shows a schematic diagram of a functional description of dual-port memory.

In practice, a single dual-port memory chip is used to implement the buffers common to a particular output. Functionally a dual-port memory chip appears as a sandwich of two large switches 12, 14 and the storage medium 16. One large switch 12 having a parallel input 13 serves to select the memory write location, and the other 14, having a parallel output 15, selects the read location, as shown in FIG. 6.

Functional Description of Dual-Port Memory

Figure 7:
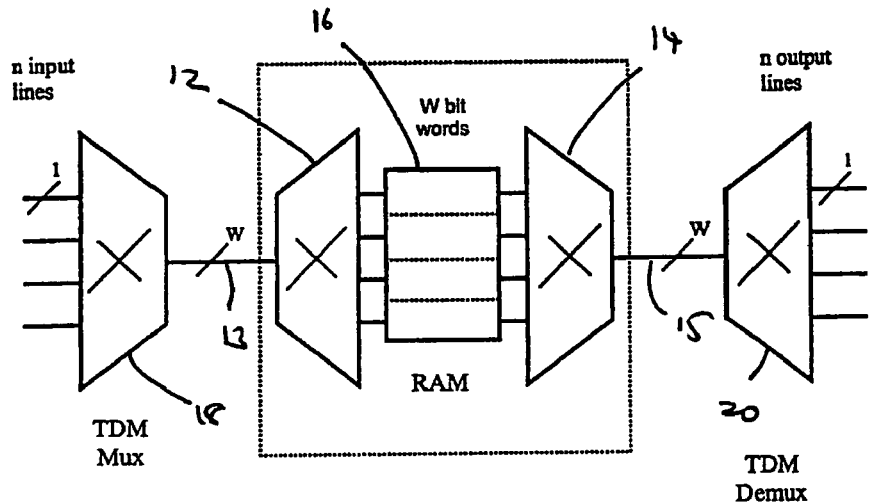
FIG. 7 shows a schematic diagram of a centralised shared memory switch and buffer.

The memory may be efficiently organised as several queues by queuing pointers to the locations where packets have been stored rather than by directly queuing the packets themselves. This may be implemented either as a linked list or by using multiple pointers. In a typical linked list, segments of a data item are stored in memory, with all locations (except that relating to the last segment) also storing an indication of storage location of the next segment, so enabling ready access to all segments. In such arrangements, the first segment is typically accessed by a pointer storing data indicative of the location of its head and tail. In a multiple pointer system, segments of a data item may be stored in memory at different locations. The address or data capable of indicating the address of each of those locations is also stored as a succession of pointers in an ordered store, and such that the head and tail of each succession is given a respective further pointer. The memory is shared between plural serial inputs by time division multiplexing plural serial to parallel converters onto the memory write-side data bus. Although for the purposes of the present discussion only one serial output is required, time multiplexing plural parallel to serial converters on the read-side data bus may provide plural serial outputs. Functionally this is equivalent to placing a multiplexer 18 and demultiplexer 20 either side of the memory of FIG. 6, as shown in FIG. 7.

Figure 8:
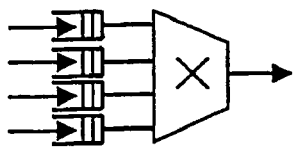
FIG. 8 shows a schematic diagram of a fan-in buffer.
Figure 9:
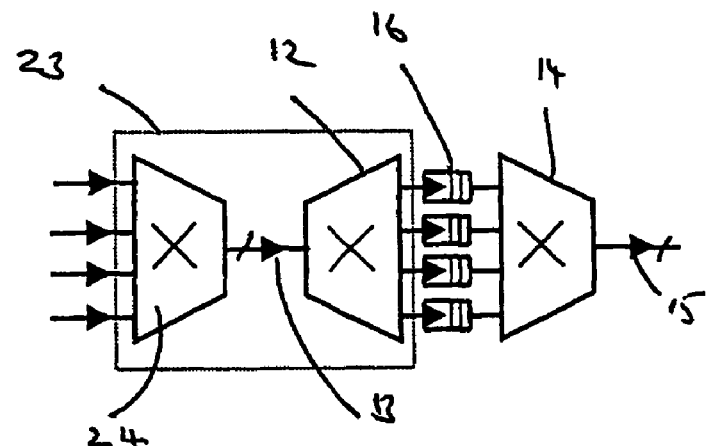
FIG. 9 shows a functional equivalent of the electronic implementation of a fan-in buffer.

A fan-in buffer shown in FIG. 8 may therefore actually be implemented electronically as shown in FIG. 9, with a large switch 12 fed via a parallel line 13 from a multiplexer 24, the output of the switch 12 feeding the storage locations of the memory 16 and the output port of the memory 16 going via a switch 14.

Functionally the block 23 comprising the connection of the demultiplexer 24 and the large switch 12 (shown in the figure within the dotted box) is an identity and should be transparent to the user, although there is an implicit serial-to-parallel conversion. The single bit-parallel path 13 is a bottleneck introduced by the electronic implementation. This bottleneck limits the incoming line rate to the memory bandwidth divided by the number of inputs. (Memory bandwidth is typically of the order of 80 Gbit/s, and will typically be higher where the memory write-side data bus is kept on-chip, i.e. by close integration of the deserialiser and multiplexer with the memory.)

FIG. 5 with the buffers implemented as in FIG. 9 and the fan-out and transpose interconnection implemented optically constitutes the simple optical fan-out/electronic fan-in (SOFO) architecture disclosed in GB patent application 2357656. The fan-out and transposition can be seen to simply replicate the inputs and may be more simply implemented using multiple imaging optics, eg holographic gratings or holograms. The crosspoint switches may be packet filters that only pass packets addressed to the output port associated with that crosspoint.

Grouping several queues together may make savings in electronic hardware. That is, the queues for more than one output are implemented within the same physical memory shared between more than one output using a demultiplexer as in FIG. 7.

Grouping provides an extra saving because the per-port memory that is required for a given packet loss rate (buffer overflow) is smaller for a grouped queue. There is also a reduction in the optical fan-out required. The penalty is that the control overhead increases with the number of grouped queues.

A disadvantage of this architecture is the large number of photo-receivers required which may dominate the cost and another is the fact that the electronic fan-in circuitry must cope with peak data rates equal to the total switch capacity. The peak rate can be limited using knockout. Knockout is a process of discarding packets without significant detriment to packet loss rates in order to limit peak bandwidth. However, users do not favour knockout.

Whether this architecture is useful depends on the control overhead. If the control overhead does not limit the degree of grouping, then grouping all the outputs together and dispensing with the optics is a solution that reduces cost for the same performance, i.e. one large electronic centralised shared memory switch. It is important to note that this conclusion only remains valid whilst it is necessary to insert the bottleneck illustrated in FIG. 9.

Figure 10:
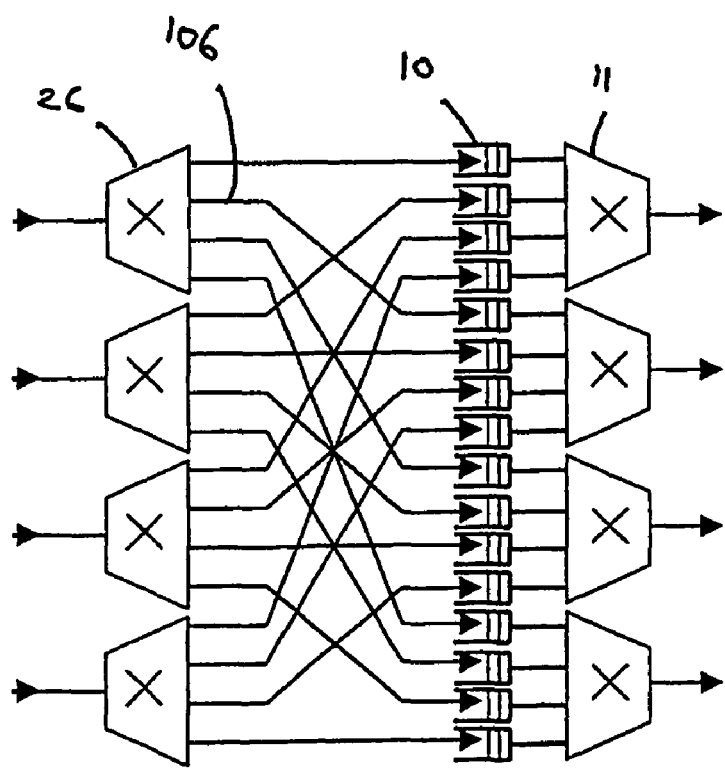

Another variant of this architecture is obtained by moving the crosspoint switches 5 of FIG. 5 to the input of the transpose interconnection. The combination of the localised fan-out followed by the crosspoint switches is a one-to-N switch. The result is the buffered route-and-select switch shown in FIG. 10, having each input fed via a switch 26 to provide fanned-out switch outputs 106, the switch 26 having the function of the crosspoint switches 5 and fan-out 6 of FIG. 5. Once again virtual input queuing is used.

Placing the crosspoint switches immediately behind the fan-out operation implies that the fan-out is now performed electrically rather than optically. If the transpose interconnection is to be implemented optically, this implies a large number of both optical transmitters and receivers. This is an increase of optoelectronic hardware and hence cost compared to the simple optical fan-out/electronic fan-in (SOFO) architecture disclosed in GB patent application 2357656.

Input-Queued Switches

Figure 11:
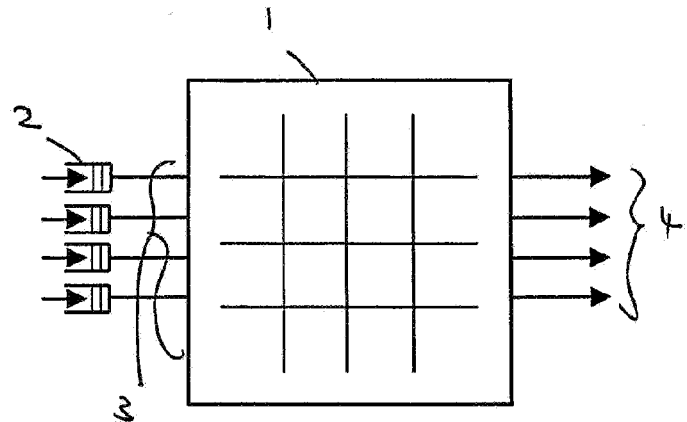
FIG. 11 shows a schematic diagram of an input-queued packet switch.

An alternative to output queuing is to place the queues at the input of the switching fabric as shown in FIG. 11. No temporal speed-up is then required: the switch fabric only has to work at the line rate.

One problem with input queuing with a simple first-in first-out queuing discipline is that packets wait for the relevant destination to become free. This holds up the progress of any packets behind it, even if their destinations are free. This effect is known as head-of-line blocking and it limits the maximum throughput of the switch to 56% for balanced Bernoulli traffic: for other traffic patterns the throughput is likely to be lower.

Methods of ameliorating this effect involve changing the queuing discipline so those packets having a free destination are allowed to jump the queue. A device known as a packet scheduler selects packets for switching according to a scheduling algorithm. The scheduling algorithm must complete this task within the time slot. Existence proofs exist for scheduling algorithms that are capable of 100% throughput. In practice a few iterations are performed of an iterative approximation to the ideal scheduler with varying degrees of success. The penalty is a considerable increase in control complexity that could ultimately be the limiting factor on throughput. Self-evidently where such measures are taken, packets are no longer guaranteed to depart the router in the same order that they arrived.

Figure 12:
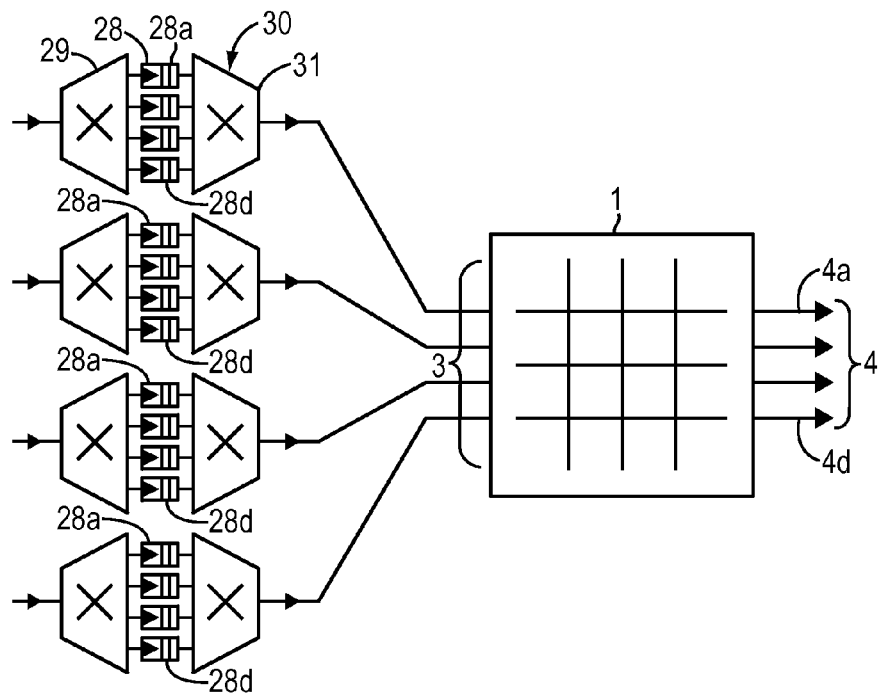
FIG. 12 shows a schematic diagram of a virtual output-queued packet switch.

The scheduling problem is simplified if a queue 28 is maintained in dual-port stores 30, (each having a demultiplexer 29 and a multiplexer 31) at each input for every output port. This popular method of input queuing is known as virtual output queuing (VOQ) and is illustrated schematically in FIG. 12. Note that for each output 4a-4d, the memories each hold a corresponding queue 28a-28d. A total of $N^2$ short queues rather than N longer queues is provided, so there is little extra cost in terms of memory which is cheap in any case. There is however an overhead in, for example, managing a large number of queue pointers. The queues associated with a particular input may be located at a line card placed a moderate distance from the switch fabric. In that case queue status information must be signalled to a centralised scheduler controlling the fabric, which adds to the control overhead. Typically the required information indicates the time the packets at the head of each queue have spent in the queue.

If possible the oldest packet amongst the queues corresponding to each output is scheduled for transmission. If more than one oldest packet resides at an input only one amongst them can be scheduled. The choice is made in some fair manner.

If more than one oldest packet resides at a single input from a set of inputs, there will be another input in the set at which no oldest packet resides. To avoid a null, a less old packet is scheduled instead from that input. This ensures that one packet is scheduled from each input that has queues with content, thereby ensuring no loss of throughput. It is clear, however, that packets do not necessarily leave on a first-in, first-out basis.

Provided the speed of operation is not compromised by the control complexity, input queuing permits the highest possible line rate, limited only by the technology. If the speed-up is achieved temporally, the line rate is reduced below the limit of the technology in output queuing by the speed-up factor. This accounts for the popularity of the virtual output queuing system in all-electronic implementations.

Figure 13:
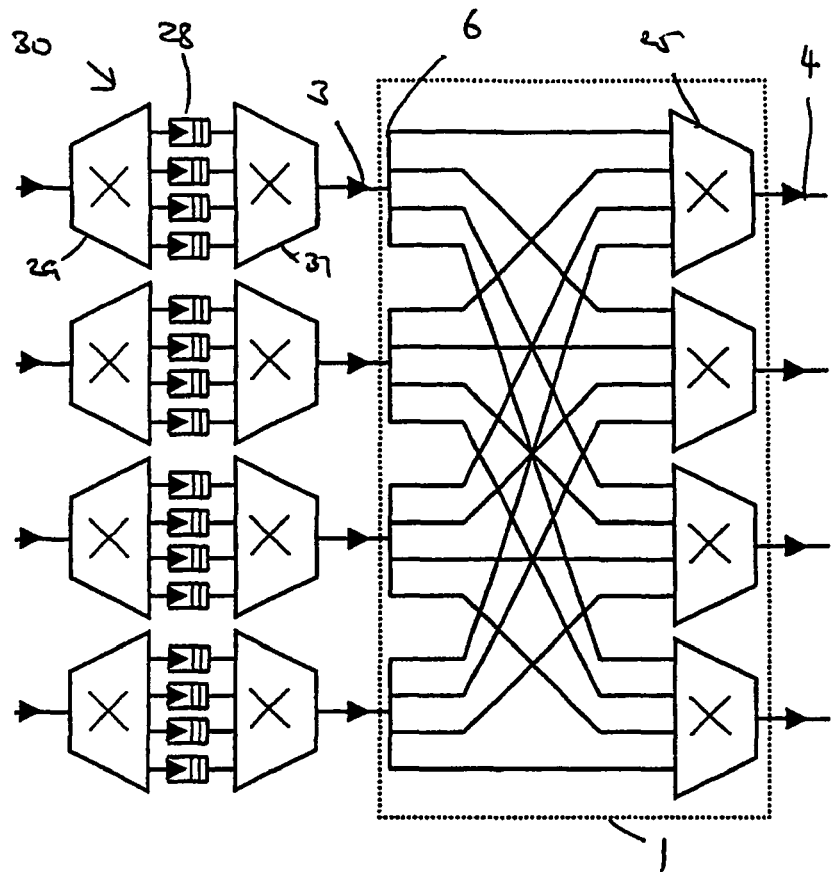
FIG. 13 shows a schematic diagram of a virtual output-queued switch showing detail of the crossbar.

Referring to FIG. 13, expanding the crossbar 1 to show the logical elements, namely fan-out 6 and switches 25, makes it clear that the simple fan-out within the crossbar is the source of the scheduling problem.

Figure 14:
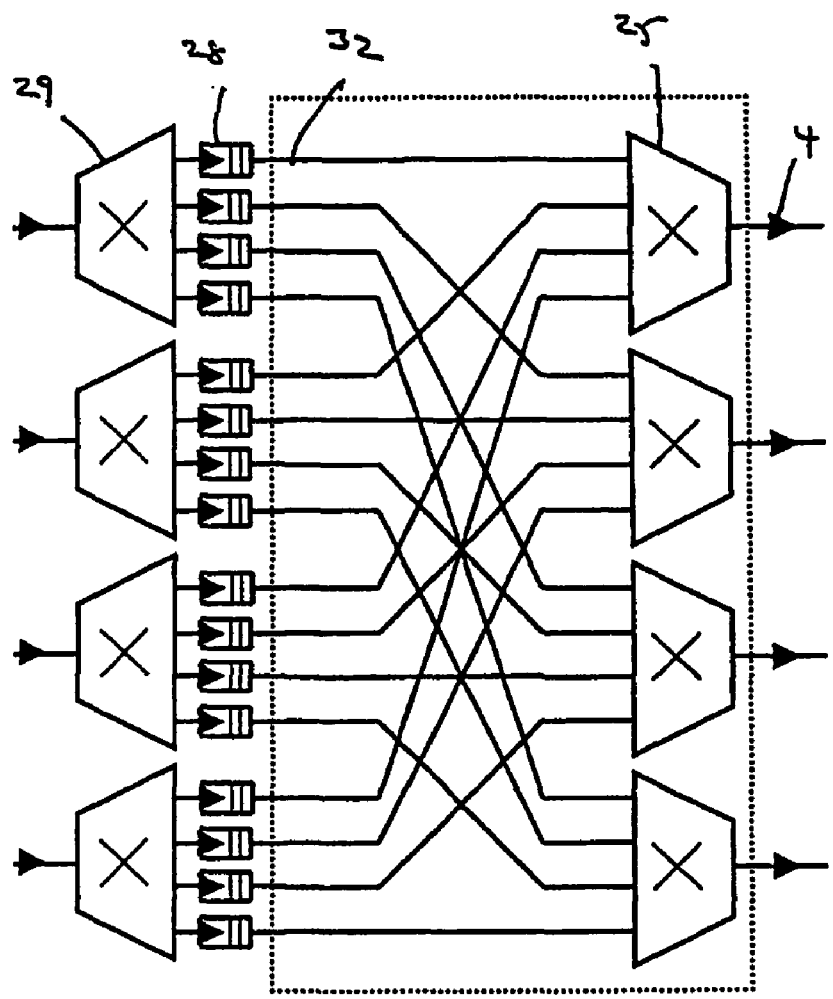
FIG. 14 shows a schematic diagram of a route-select switch with buffered fan-out.

The scheduling problem disappears completely if the multiplexers 31 and fan-out operation 6 are replaced by a direct connection 32 as shown in FIG. 14. This can again be recognised as a form of cross-point queuing but with the cross-points and buffers placed on the input side of the transpose interconnection.

Figure 15:
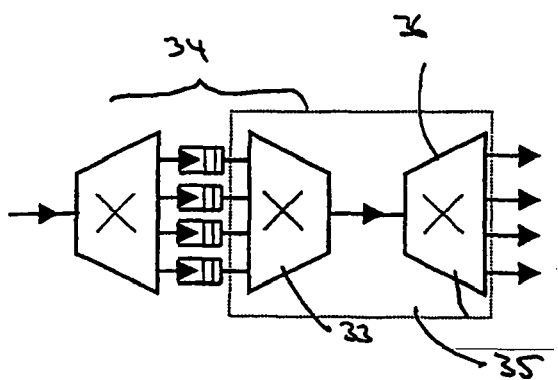
FIG. 15 shows a functional equivalent of the electronic implementation of a fan-out buffer.

An implementation using electronic memory technology necessarily means that the buffers corresponding to a particular input functionally appear as in FIG. 15, showing the dual-port store 34 feeding a demultiplexer 36.

Again, as with FIG. 9, functionally the block 35 containing the output multiplexer 33 of the store and the demultiplexer 36 (shown within the dotted box) is an identity and should be transparent to the user, although there is an implicit parallel to serial conversion. The single (bit-parallel) path in the middle is a bottleneck introduced by the electronic implementation, which limits the outgoing line rate to the memory bandwidth divided by the number of outputs to the memory.

Grouping several queues together may make savings in electronic hardware. That is, the queues for more than one input are implemented within the same physical memory shared between the inputs using a multiplexer as in FIG. 7.

Grouping provides an extra saving because the per-port memory that is required for a given packet loss rate, due to buffer overflow, is smaller for a grouped queue. There is also a reduction in the number of optical pathways required. The penalty is that the control overhead increases with the number of grouped queues.

A disadvantage of this architecture is the large number of sources required which may dominate the cost. The second stage multiplexers may be identical to the fan-in buffer shown in FIG. 9. Control may then be localised to the electronic islands only if it is not required to strictly emulate an output-queued switch. Alternatively, it is feasible to use simple electrical fan-in following gated photo-receivers or even optical fan-in with gated sources. Information is then signalled from each island to the scheduler that controls the gates.

Centralised Shared Memory Switch

Figure 16:
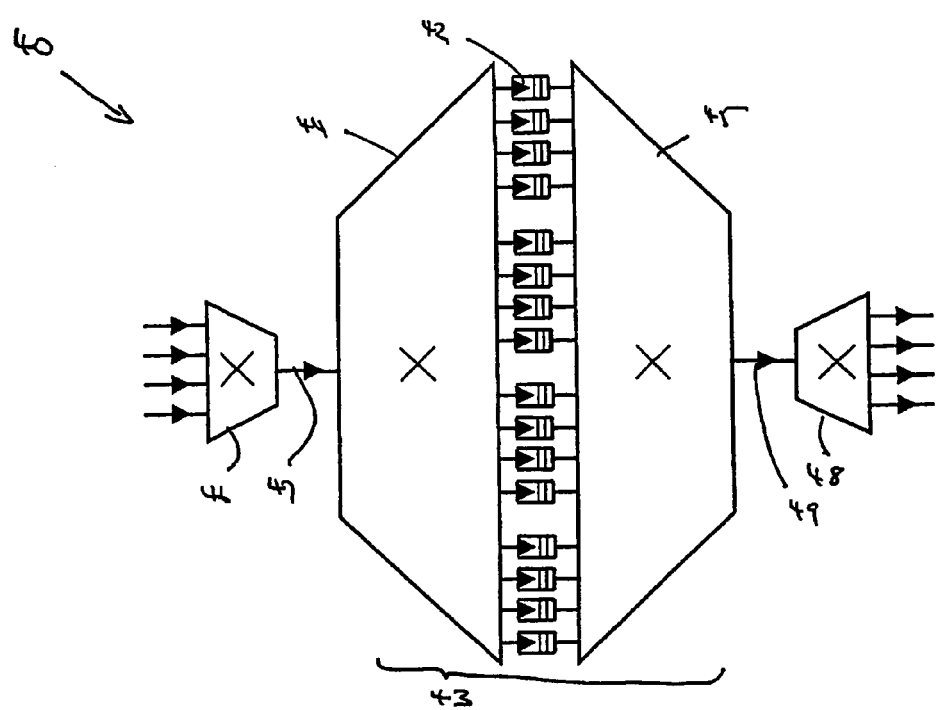
FIG. 16 shows a schematic diagram of a centralised shared memory switch with queue organised as crosspoint queues.

FIG. 16 shows a centralised shared memory switch 40 with queues 42 organised as crosspoint queues of a dual-port memory 43 having write circuitry 44, functioning as a demultiplexer, and read circuitry 45 functioning as a multiplexer. The input demultiplexer 44 has its inputs from a multiplexer 46 and the output multiplexer 45 feeds a demultiplexer 48. Thus the buffers shown in the centre form the queues for packets that arrive on a given input port and that are destined for a given output port. Hence, for a switch there are data flows, eg queues, each corresponding to a unique input-port/output-port pair.

The centralised shared memory switch may be understood first as an extension of a time-division-multiplexed (TDM) crossbar switch—see FIG. 7. Such a switch operates by writing out the contents of a TDM frame in an order different to the order in which the contents are read-in. Placed between a TDM multiplexer and demultiplexer this is equivalent to a space switch. Because a whole frame must be stored before its components can be re-arranged, there is a latency of one frame time. In the case of a packet switch, packets must be retained within a switch whilst they wait for the destination port to be free. This can be simply achieved by increasing the storage to accommodate deeper buffers, for example managed using pointers as described earlier.

A problem for the centralised shared memory switches is memory access contention that corresponds to the bottleneck evident in FIG. 16 as the single bit-parallel link 47 connecting the input multiplexer and the write-side memory and as the single bit-parallel link 49 connecting the output demultiplexer and the read-side memory. In practice both these links are bit-parallel data busses. The memory bandwidth is therefore shared between the inputs and outputs so that the total capacity is unchanged by the number of inputs or outputs.

Advantages of a centralised shared memory switch are:

1) it exactly emulates an output-queued switch, 2) its grouped queues are very memory efficient, and 3) a variety of non-FIFO queuing disciplines are simply implemented to offer quality of service guarantees.

For simplicity, queues discussed herein are organised as crosspoint queues with a first-in first-out queuing discipline. It is important to note that plural virtual input queues corresponding to a particular output port with the fan-in multiplexer selecting, for example, the oldest cell at the head of the queues for departure, are equivalent to a single queue with a push-in first-out queuing discipline. A multiplexer controlled in an appropriate manner can select cells according to other queuing disciplines, for example, weighted fair queuing (WFQ). Conversely, a group of virtual output queues corresponding to a particular input port are equivalent to a single queue that implements the first-in push-out discipline. In this discipline, cell order for each output is preserved but cells destined for a particular output may depart before earlier-arriving cells destined for another output.

Further flexibility is offered by the fact that the input port multiplexers and output port demultiplexers need not be located physically close to the centralised shared memory switch and may be composed of multiple stages. They can even be thought of logically rather than physically, so for example a particular input port might then correspond to a particular traffic classification. Hence, the crosspoint queues then queue traffic flows that are classified on the basis of source/destination and traffic type (eg multi-media, or data files) or service type (eg assured forwarding, expedited forwarding, best efforts). This can be done by routers at the edge of the network using information (eg TCP headers) found within the payload in addition to that found in the IP header. Ideally, there is a separate queue for each source/host and traffic type. However if this were implemented within the core of the network, the number of queues would be excessive. It is thus better to buffer traffic of the same type aggregated over many source/host pairs.

Sectoring

Figure 17:
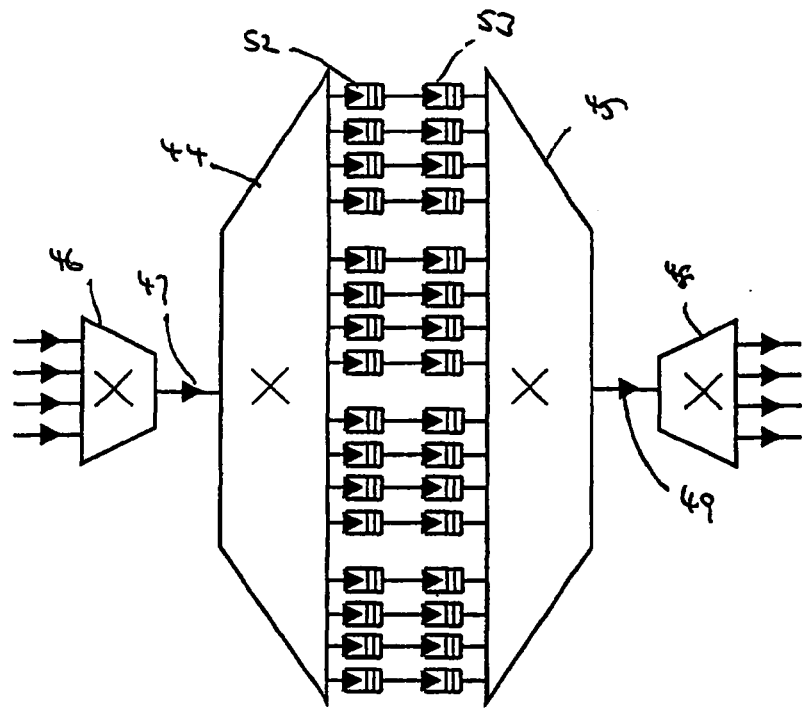
FIG. 17 shows a schematic diagram of a centralised shared memory switch with split buffers.

The bottleneck caused by memory write-access 47 and read-access 49 contention may be alleviated by the process of sectoring. The first step in the process is to split the buffers into two half-queues 52, 53 in series as shown in FIG. 17. This leaves the switch functionally unaltered, provided the service rate from the first half-queue equals or exceeds the peak service rate from the second half queue.

Figure 18:
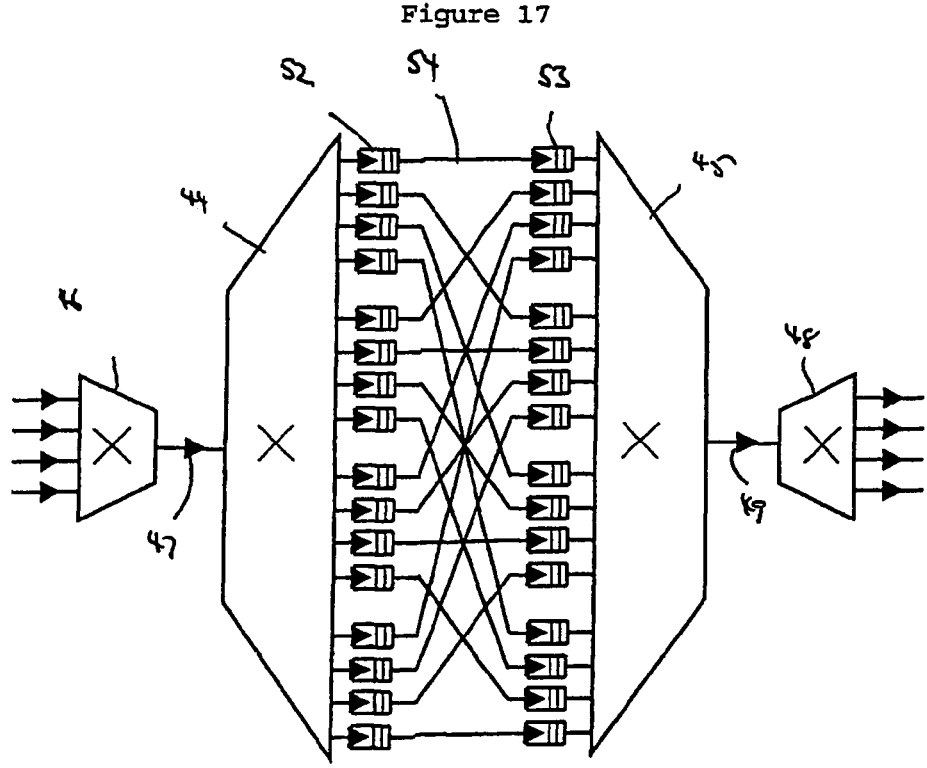
FIG. 18 shows a schematic diagram of a centralised shared memory switch with crosspoint buffers organised as a cascade of virtual output queues (VOQ) and virtual input queues (VIQ)

The switch further remains functionally unaltered by organising the crosspoint buffers by input port on the input side and by output port on the output side. The preservation of a one-to-one connection between the buffer pairs despite the re-ordering leads to a transpose interconnection 54 between the split buffer pairs as shown in FIG. 18.

Effectively the first half of the split buffers are organised as virtual output queues and the second half of the split buffers are organised as virtual input queues. This permits the splitting of the write-side 45 and read-side 44 switches into per-input switches 55, 56 without change of function, as shown in FIG. 19.

Figure 19:
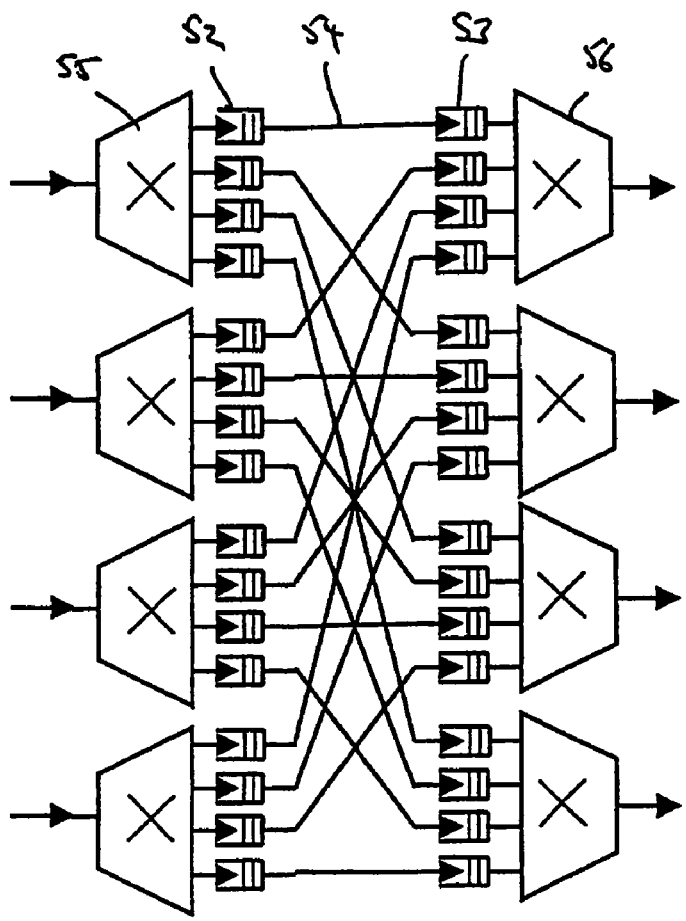
FIG. 19 shows a schematic diagram of a sectored centralised shared memory switch with one input port per input sector and one output port per output sector.
Figure 20:
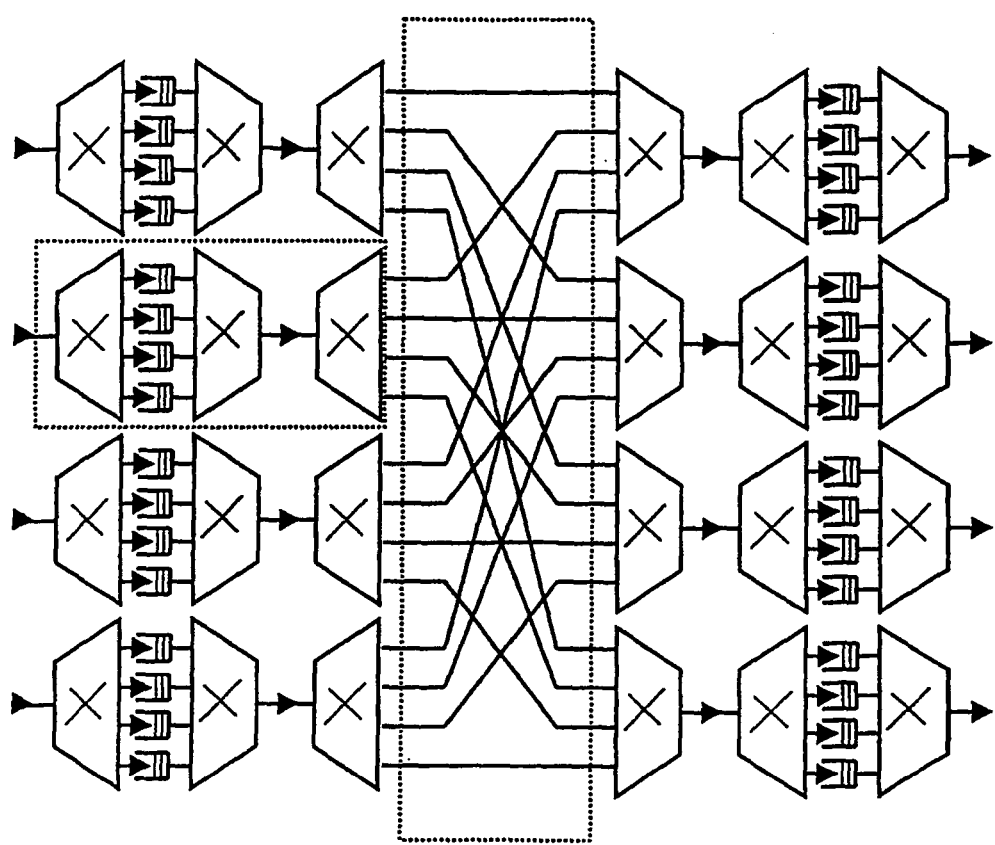
FIG. 20 shows a schematic diagram of a sectored centralised shared memory switch with one input port per input sector and one output port per output sector and the demultiplexer/deserialisers and multiplexers/serialisers of the central transpose interconnection explicitly shown.
Figure 21:
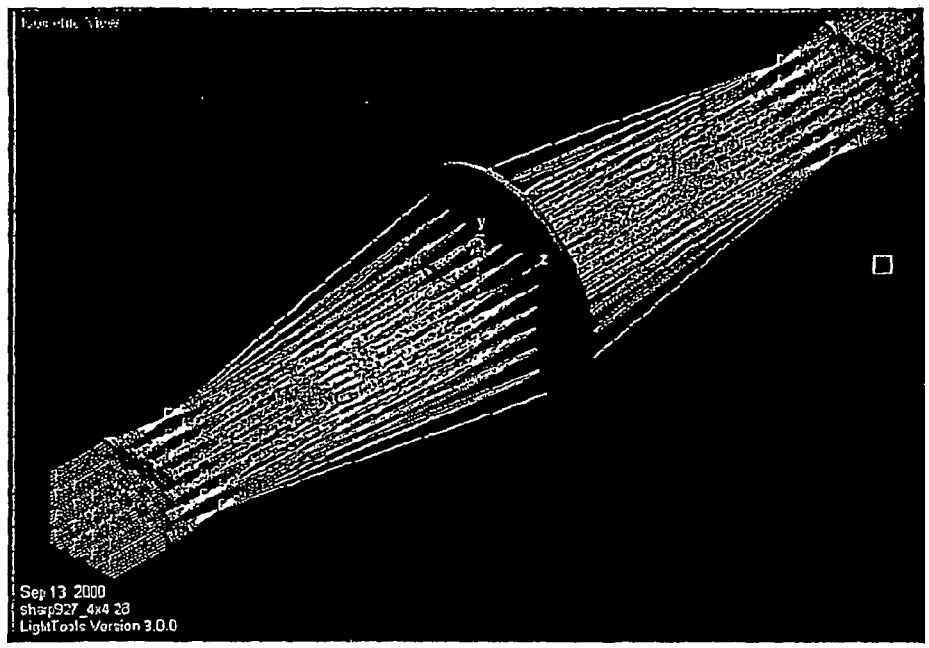
FIG. 21 shows a schematic diagram of a 256×256 optical transpose interconnection.

FIG. 19 can be recognised as a set of fan-out buffers connected to a set of fan-in buffers via a transpose interconnection. It is a buffered version of a route-select circuit switch. In practice, the fan-in buffers and fan-out buffers are implemented electronically using the information from FIGS. 9 and 15 respectively to achieve what is shown in FIG. 20. A transpose interconnection may be implemented optically as shown in FIG. 21. An optical transpose interconnection is disclosed in WO 215633 (PCT/GB01/03643).

Both write-access and read-access memory contention is eliminated in this architecture, as the full memory bandwidth is available to each input and output. The penalty is the $N^2$ transmitters and receivers required by the optical transpose interconnection.

Figure 22:
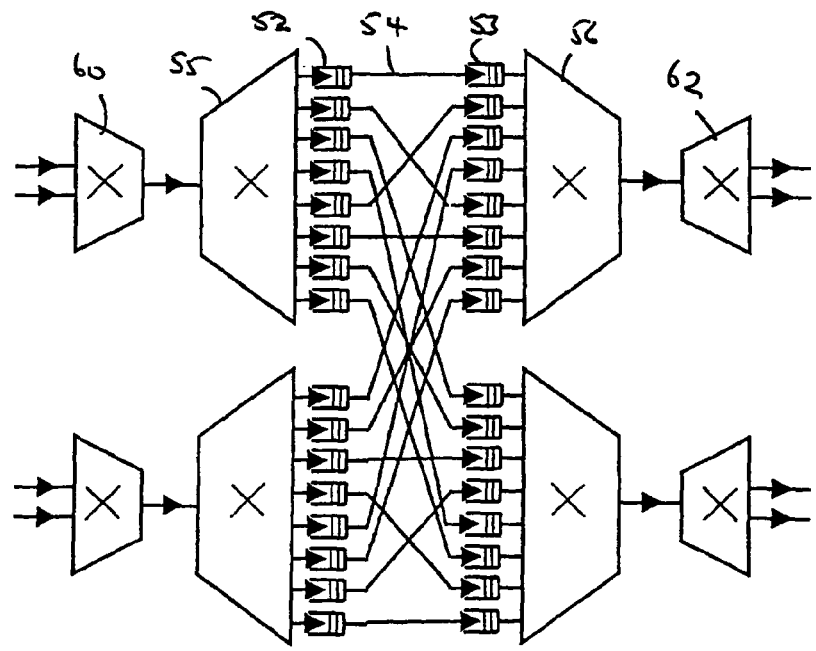
FIG. 22 shows a schematic diagram of a sectored centralised shared memory switch with two input ports per input sector and two output ports per output sector.
Figure 23:
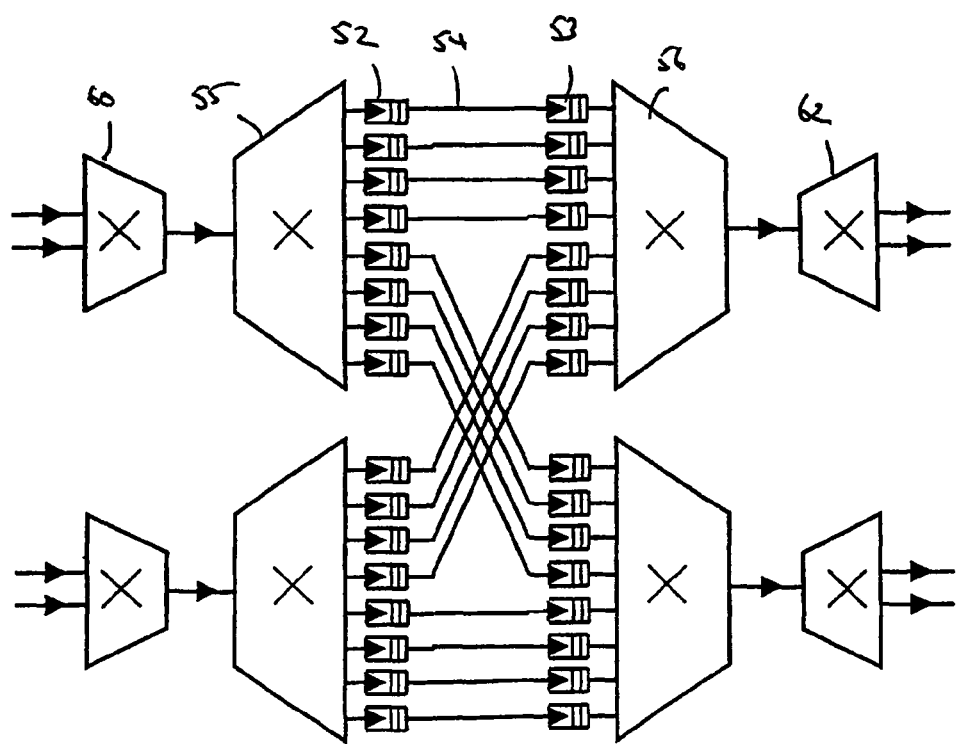
FIG. 23 shows a schematic diagram of a sectored centralised shared memory switch with two input ports per input sector and two output ports per output sector, with the buffers re-ordered to explicitly show the multiple links within each arm of the inter-sector transpose interconnection.

Hardware savings may be made by grouping queues into sectors at the input and at the output, with the input and output sectors connected by connection arms. An arm is the set of links that connect an input sector to a single output sector. However the technique of grouping has the cost of reintroducing memory access contention, as memory access is now shared between the members of the group. In the general case, the group sizes at the input and at the output may be different However, the maximum group size is determined by the memory bandwidth that is likely to be the same for all the sectors which favours a symmetric arrangement FIG. 22 shows a symmetric case of a 4×4 switch with two inputs per sectors and two outputs per sector. In this switch each input is fed to a respective per sector multiplexer 60, and the bit-parallel outputs fed to a switch similar to FIG. 19, having per-sector input demultiplexer 55, buffer 52, 53 and transpose 54. The outputs comprise a per-sector output multiplexer 56 and a per-sector output demultiplexer 62. FIG. 23 is derived from FIG. 22 with the buffers re-ordered to more clearly show the multiple links within each arm of the transpose interconnection between the sectors.

For a N×N switch having $N^2$ queues, there are $N^2$ paths between the $N^2$ queues, each formed as a split buffer. In each time slot at most N packets are conveyed between input queues and output queues, and therefore the speed-up factor of this switch is equal to N. A lesser speed-up factor can however still prevent internal congestion.

If there are n input ports per input sector and n output ports per output sector, then there are S=N/n input sectors, S=N/n output sectors. There are S*S=(N/n)*(N/n) arms connecting the input queues to the output queues for example via a transpose interconnect. A necessary condition to avoid congestion in the input sectors is that the total number of pathways between the input sectors and output sectors must be at least N. Assuming the links are distributed uniformly over the arms, the number l of links per arm is bounded by the relation (1) below:

$$(n^2/N) \leq 1 \leq n^2 \qquad (1)$$

(where n is the number of input ports per input sector and the number of output ports per output sector, N is the minimum number of pathways between input and output sectors and 1 is the number of links per arm).

For convenience the capacity of each link is taken as one packet per time slot. A trade-off can be made between time, space and even wavelength. A fractional space link therefore may be a link running at a lower speed Conversely multiple links can be time-division-multiplexed onto a single higher speed link. A traffic matrix is a matrix having elements formed by the offered load between each input port and output port, in other words a set of representations of the incoming data per port with entries representative of each output port to which the data is destined. A traffic matrix is admissible if the traffic does not overload any input port or output port of an ideal switch. The number l of links per arm need be no greater than n to support any admissible traffic matrix.

Balanced traffic is defined as the case where packets arriving at each and every input port have destination addresses uniformly distributed over the output ports. For balanced traffic, each of the arms of the transpose interconnection carries at most $n^2/N$ packets per time slot. Therefore so long as $n^2 \leq N$, i.e. $n \leq N^{1/2}$, a single link can carry balanced traffic.

Returning to the general traffic situation, the number m of output ports from an input sector and the number m of input ports to an output sector is given by equation (2):

$$m = N*1/n = k*n \quad (2)$$

(where k is the speed-up)

Where the memory bandwidth is B packets per time slot, the sector port dimensions are bounded by relation (3):

$$n, m \leq B \quad (3)$$

Hence the maximum number of ports per sector, and maximum overall switch size are determined by equations (4) and (5):

$$n = B/k \quad (4)$$

$$N = k \, n^2/l \quad (5)$$

It is convenient to choose $N=n^2$, and the number l of links in each arm to be equal to the speed-up k. A smaller number of links per arm allows a larger switch but the switch performance is traffic dependent for:

$$1 \leq l < n \quad (6)$$

It is therefore possible to economise on the number of links, and hence on the optoelectronic hardware, by sharing a reduced number of links within each arm between the corresponding queue buffers.

Any admissible traffic matrix may be supported if the equation (7) is satisfied:

$$l = n \quad (7)$$

Figure 24:
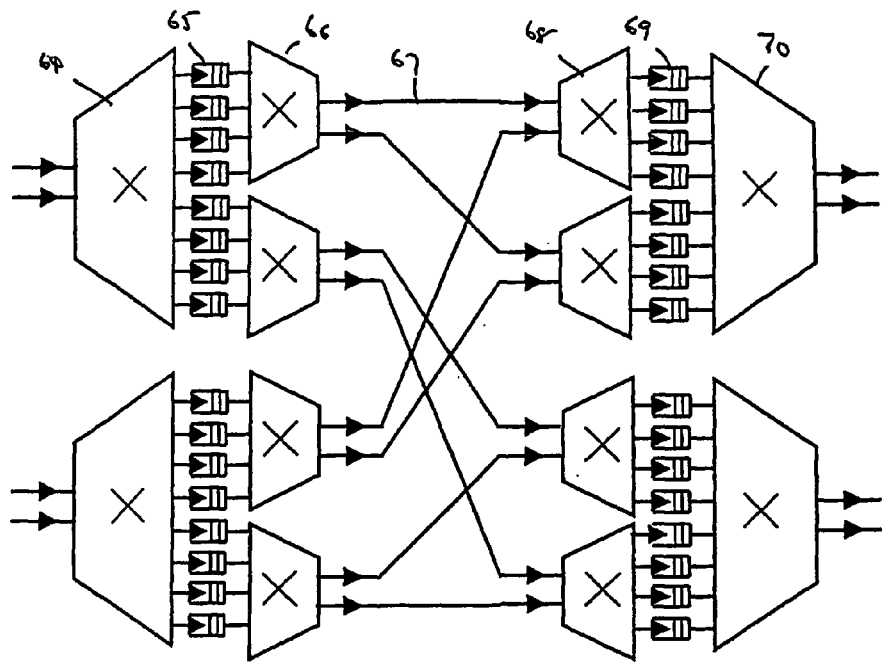
FIG. 24 shows a schematic diagram of a sectored centralised shared memory switch with shared pathways.
Figure 25:
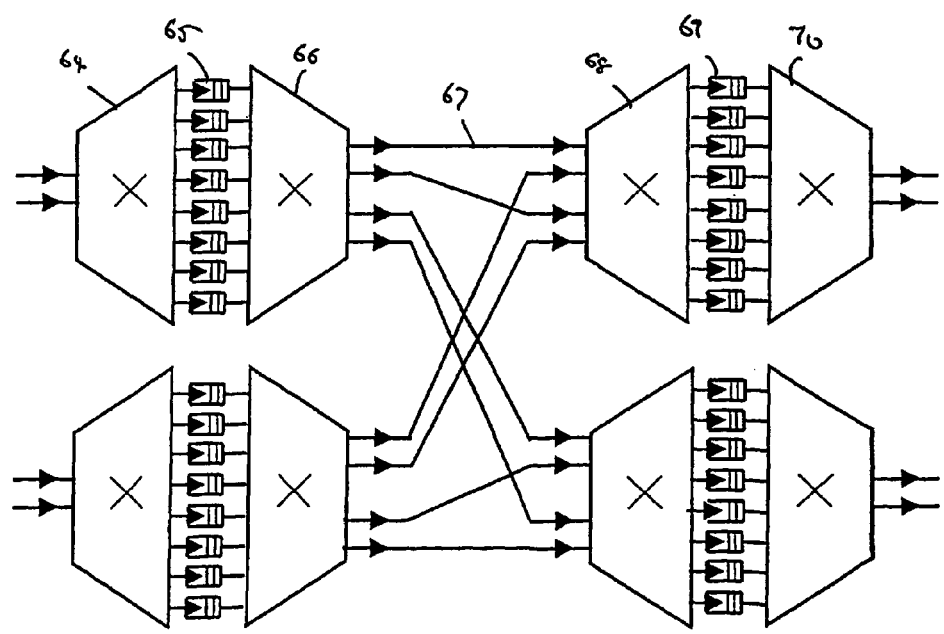
FIG. 25 shows a schematic diagram of a sectored centralised shared memory switch with shared pathways and grouped multiplexers, having connections re-ordered to group links together within the arms of the inter-sector transpose interconnection.

This strategy is illustrated in FIG. 24 having two two-input demultiplexers 64 feeding input queues 65, four two-output multiplexers 66 feeding the queue outputs via an interconnect 67 to four two-input demultiplexers 68 having output queues 69 at their outputs, and two output per-sector multiplexers 70 receiving the output queues. With better use of hardware, this is redrawn as FIG. 25.

For l<n, as noted above, in (6) the switch is traffic dependent. However, the traffic dependence may be removed by adaptively reconfiguring the interconnection so that the number of links within each arm is sufficient to support the intersector traffic.

It should be borne in mind that the switch capacity C is related to the memory bandwidth B by relation (8)

$$C = B*S \quad (8)$$

which implies that S (the number of input and output sectors) is desirably maximised if switch capacity is to be maximised.

To be able to cope with all admissible traffic patterns, each arm of the intersector transpose connection needs the capacity to handle the possibility that the flows on every input port to a sector are destined to the same output sector. "Admissible" means that no input port and no output port is oversubscribed assuming the switch has no internal capacity limitations. Given the total of N input (output) ports partitioned into 'S' input (output) sectors each having 'n' input ports, such a transpose then has S*S arms each capable of carrying n packets in a time slot. In terms of links with the same capacity as the input/output links this equates to S*S*n links (N*N/n). This compares to the k*S*n links (k*N) of the reconfigurable interconnect (where k is the 'speed-up')

If the cost per transpose link is a and the cost of a switch is b, then:

Cost of fixed transpose=a*S*S*n

Cost of reconfigurable transpose=a*k*S*n+b*k*n

Since the cost is linear in S with reconfiguration and quadratic in S without reconfigurable transpose, the large S needed for high capacity means that a reconfigurable transpose is preferable.

Figure 26:
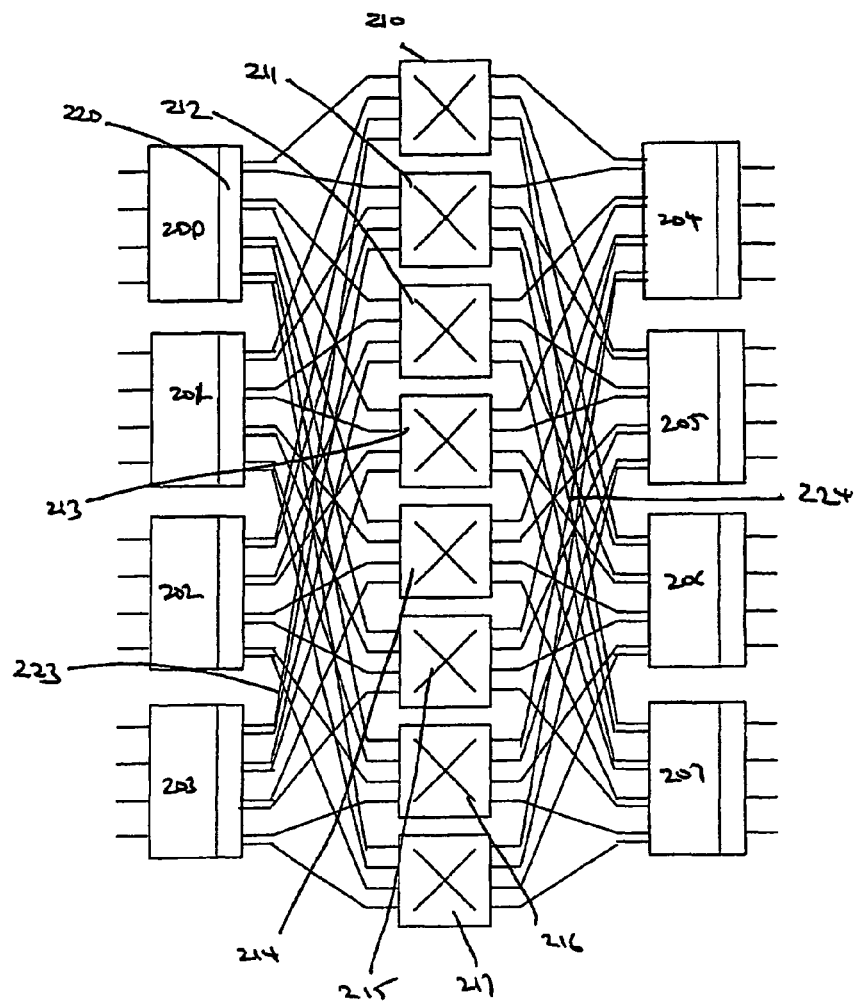
FIG. 26 shows a schematic diagram of a three stage Clos-like packet switch.

Referring to FIG. 26 a Clos-like three stage switch has four input stages 200-203, and four output stages 204-207 connected together by an optical interconnection network having eight reconfigurable optical cross-connect devices 210-217. Each cross-connect has the functionality of a crossbar and is thus capable of connecting any one of its inputs to any one of its outputs. Thus N=16 and n=4. The input and output stages have the structure of the centralised shared memory switch of FIG. 16, modified to take account of the difference between the numbers of inputs and outputs of these stages to provide spatial speed-up. They thus provide electronic storage of the relevant queues. The input stages each have eight VCSEL outputs 220 and the output stages each have eight photodiode input stages. Thus n=8, and there is a speed-up of k=2. The optical cross-connect devices each have four inputs and four outputs. A first network 223 of optical fibres connects the outputs of the input stages to the inputs of the optical cross-connect devices 210-217, with each input stage connected via one fibre to each cross-connect. A second network 224 of optical fibres connects the outputs of the optical cross-connect devices 210-217, to the inputs of the output stages 204-7 in like fashion. By inspection of FIG. 26, the number l of links per arm is given by l=2. Thus a number of 'electronic islands' surrounds an optical switch fabric. In an alternative embodiment, the reconfigurable elements are formed as further electronic islands formed as TDM switches. This however would be at the cost of further optical-to-electronic and electronic-to-optical conversions. The TDM switches of this alternative embodiment also have the structure of the centralised shared memory switch of FIG. 16.

In the described embodiment therefore, with l=2 and n=4, clearly l<n.

As a circuit switch the embodiment is rearrangeably non-blocking for a speed-up of unity. The term "rearrangeably non-blocking" as applied to switching networks, covers networks which rely upon the fact that while there may not be a path available, one can be opened up by moving some of the other signals to different paths. This can be done without any loss or disconnection of existing signals, by setting up each new path, and switching to it before removing the old path.

A suitable scheduling algorithm can therefore ensure congestion-free operation for any non-stationary admissible traffic matrix. A speed-up factor of k=2 offers strictly non-blocking operation as a circuit switch and hence will simplify the scheduling algorithm. Once set up for a particular traffic pattern, the optical cross-connects link selected ones of their input paths to selected ones of their output paths on a fixed basis. This fixed basis remains fixed while the input traffic continues to follow the pattern for which the set-up was made.

Once the statistics of the traffic change so as to no longer conform to the pattern, a new set of links is set up, as will be later described herein. Data is output onto sequential input paths as a result of the demultiplexer (48—see FIG. 16) in each input stage 200-203, which receives data from the sector memory (see FIG. 16). Congestion-free operation then only requires the central stage to reconfigure on a time scale that characterises the statistical traffic variation.

Furthermore, it has been shown that there exists a scheduling algorithm that permits a combined input and output-queued switch to emulate perfectly an ideal output-queued switch. In practice economic considerations and expected traffic statistics might lead to switches having central stages with some fixed paths (eg provided by fixed optical transpose), some semi-permanent reconfigurable paths (eg provided by ferro-electric liquid crystal, or similar shutters) and some rapidly reconfigurable paths (eg by electronic TDM switches with optoelectronic interfaces).

It is interesting to note that the Internet is evolving towards a structure in which routers surround a circuit switched core that is ideally non-blocking and therefore topologically similar to FIG. 26. Furthermore, larger switches themselves topologically similar to FIG. 26 can be constructed using switch modules identical to FIG. 26. The properties of these self-similar networks are currently under investigation.

Centralised shared memory switches are known to emulate ideal output-queued switches. They support the variety of queuing disciplines required to implement quality of service guarantees. Their limitation is that memory access contention limits the switch capacity to the memory bandwidth independent of the number of ports.

Figure 27:
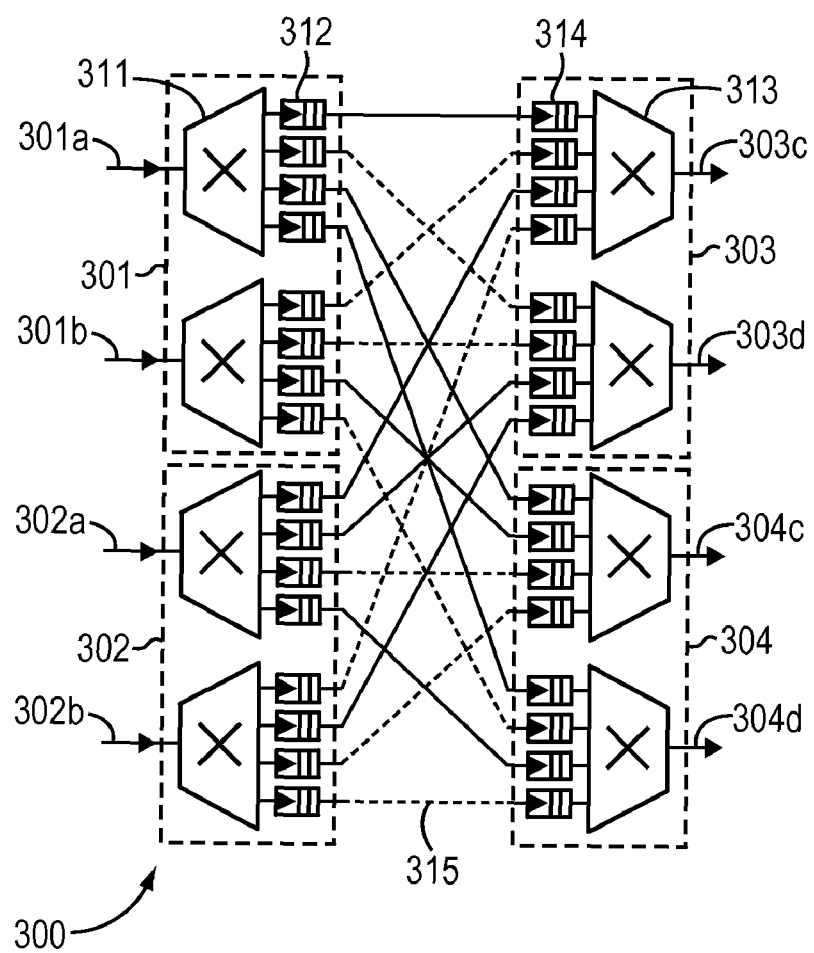
FIG. 27 shows a schematic diagram of the logical equivalent of the sectored switch using crosspoint queues.

FIG. 27 shows the logical structure of a sectored switch derived from the centralised shared memory switch of FIG. 16. This logical structure corresponds to the physical structure shown in FIG. 26. The derivation proceeds as follows:

1. The individual cross-point queues are divided into pair of half-queues 312, 314 connected in series on either side of a central dividing plane.

2. The half-queues on the input side of the dividing plane are ordered first by input port and second by output port. The half-queues on the output side of the dividing plane are ordered first by output port and second by input port. This introduces a transpose interconnection in the centre that preserves the series connection between corresponding pairs of half-queues. The half queues on the input side may be thought of as virtual output queues. The half-queues on the output side may be called virtual input queues.

3. The write-side deserialiser-multiplexer-switch (TDM receiver shift registers on the write-side memory bus) is sectored into independent smaller deserialiser-multiplexer-switches each serving a sub-set of the input ports and the associated input-side half-queues. This reduces memory write-access contention.

4. The read-side switch-demultiplexer-serialiser (TDM transmitter shift registers on the read-side memory bus) is sectored into independent smaller serialiser-demultiplexer-switches each serving a subset of the output ports and associated output-side half-queues. This reduces memory read-access contention.

5. The half-queues within sectors may be managed naturally and memory-efficiently as grouped sub-queues sharing sectored memory.

6. The sectoring of memory interposes a switch-demultiplexer-serialiser on the input side of the transpose interconnect and a deserialiser-multiplexer-switch on the output side of the transpose interconnect. Logically these are transparent and a 1:1 connection between half-queues is preserved without contention. Memory read-access contention is introduced in each input sector and memory write-access contention is introduced in each output sector. However, there is no overall deterioration of bandwidth provided the sector memory is dual-ported.

7. The individual paths of the transpose interconnect that connect the same input-sector/output-sector pair are collected into bundles that form the inter-sector arms of a transpose bus interconnection between input and output sectors.

8. The utilisation of the bundles may be improved by reducing the number of physical links that make up the bundles whilst preserving the logical links between the associated half-queues, i.e. reducing the speed-up from k=N to some more modest value, typically with k lying between 1 and 2. This does however introduce traffic-pattern dependence.

9. A reconfigurable interconnection permits a fixed pool of physical links to be partitioned between the arms of the bus transpose, i.e. the number of physical links that make up each bundle may be varied according to need. This permits the switch to adapt to different traffic patterns whilst making efficient use of its resources.

The resulting logical structure is shown in FIG. 27. Referring to FIG. 27, the switch 300 has two input sectors 301, 302 each with two input ports 301a, 301b; 302a, 302b. Likewise there are two output sectors 303, 304 each having two output ports 303c, 303d; 304c, 304d. Each input sector comprises a pair of four input demultiplexers 311 having outputs to queue storage 312; each output sector comprises a pair of four output multiplexers 313 having inputs from queue storage 314. A reconfigurable interconnect 315 connects input-side half-queues to output side half-queues. A snap shot is shown of active interconnect paths corresponding to a speed-up of k=2. Inactive paths are shown dotted. Each input sector 301, 302 has four output ports and each output sector has four input ports linked by the active paths and logically routed to corresponding half-queues. The interconnect configuration shown has one path between the upper input sector 301 and upper output sector 303; three paths between the upper input sector 301 and lower output sector 304; three paths from the lower input sector 302 to upper output sector 303; and one path from the lower input sector 302 to the lower output sector 304.

The dotted and solid lines together to show the logical connections between the crosspoint half-queues with the solid lines indicating those currently enabled in a particular 'frame' (timeslot associated with the external input port line rate). An enabled connection may remain idle if the associated queue in the input sector is empty. If it is not empty the packet at the head of the queue is transported. More on this below.

Note that FIG. 27 shows:
1 solid line between the upper input sector and the upper output sector;
3 solid lines between the upper input sector and the lower output sector;
3 solid lines between the lower input sector and the upper output sector,
1 solid line between the lower input sector and the lower output sector;

These 8 solid lines correspond to the eight physical paths that may be set up by the configuration of the central stage crossbars—this corresponds to a speed up of two, i.e. eight packets may depart from the first stage queues, up to one on each physical path; in the time that up to four packets may arrive, up to one on each input line. Also note that the sum of the solid lines incident on each sector is four.

This corresponds to the constraint that each sector has a physical connection to one of four central 2 by 2 crossbars— again consistent with the Clos-like structure and the speed-up of two. The eight physical paths may be compared to the sixteen physical paths required to handle variable traffic patterns if there were no reconfiguration. The reduction of total paths becomes more favourable as switch dimension is scaled up.

The association of the physical paths between the sectors and the specific queues within the sector is a scheduling process that is the responsibility of the store controller—this is electronic and fast and only information local to the sector is required. The number of physical paths between sector pairs may be changed by reconfiguring the central crossbars but this may be a slower processes if they are implemented optically and global information is required.

It is true that it is more efficient to enable paths from queues with content. This reduces delay. Indeed, provided there are sufficient packets waiting to be transported between a sector pair, the paths between that sector pair will be active under the oldest packet first scheduling process within a sector. A physical path will only fall idle if there are no packets waiting for transport between the associated sector pair. (This is not true for the simpler round robin queue selection procedure). To do better than this would require the ability to change the number of intersector paths 'on the fly' to try to keep all paths active—but that would require the power hungry fast central switch and complex centralised scheduler that this invention is seeking to avoid. This does mean that one pays slightly in terms of average queuing delay but simulations show that this is minor.

Note that for ease of exposition the queues are organised as cross-point queues, i.e. one for each external input-output port pair. In practice one may merge such queues into, for example, intersector queues at the input and straight output queues at the output and use different service disciplines than FIFO. The use of inter-sector queues at the input and straight output queues at the output with FIFO disciplines yields the benefit of reducing the complexity of the store controllers scheduling duties—the price paid is that packet departures cannot be guaranteed to be the same as an ideal output queued switch in any range of traffic parameters and speed-up. Emulation of an output queued switch is theoretically possible using a complex non-FIFO insertion/departure discipline. Indeed the expansion of the inter-sector queues and straight output queues into cross-point queues merged using an 'oldest cell first' scheduler can be considered to be a means of implementing the inter-sector and output queues with a non-FIFO queuing discipline.

In summary, the physical paths between sector pairs are configured by the central stage controller to handle the volume of intersector traffic. The store controllers configure the connections between queues and paths to maintain the correct logical connections between queues. Information in the packet's local header such as time stamp, source port address and destination port address assist the store controllers in this task. (Whether all this information is required depends on the complexity of the queuing structure and discipline).

Variants within this architectural family have various functions placed before or after the optical interconnect, provide different degrees of efficiency of use of the interconnect bandwidth and provide different detailed partitions between optical and electronic technology. Variants also use differing organisations of queues and their control.

A state-of-the art router of known design is organised as a set of line-cards interconnected by a high-speed crossbar switch controlled by a scheduler. The line-cards inter alia contain the input queues for the crossbar and also typically output queues (at least for packet reassembly).

Figure 28:
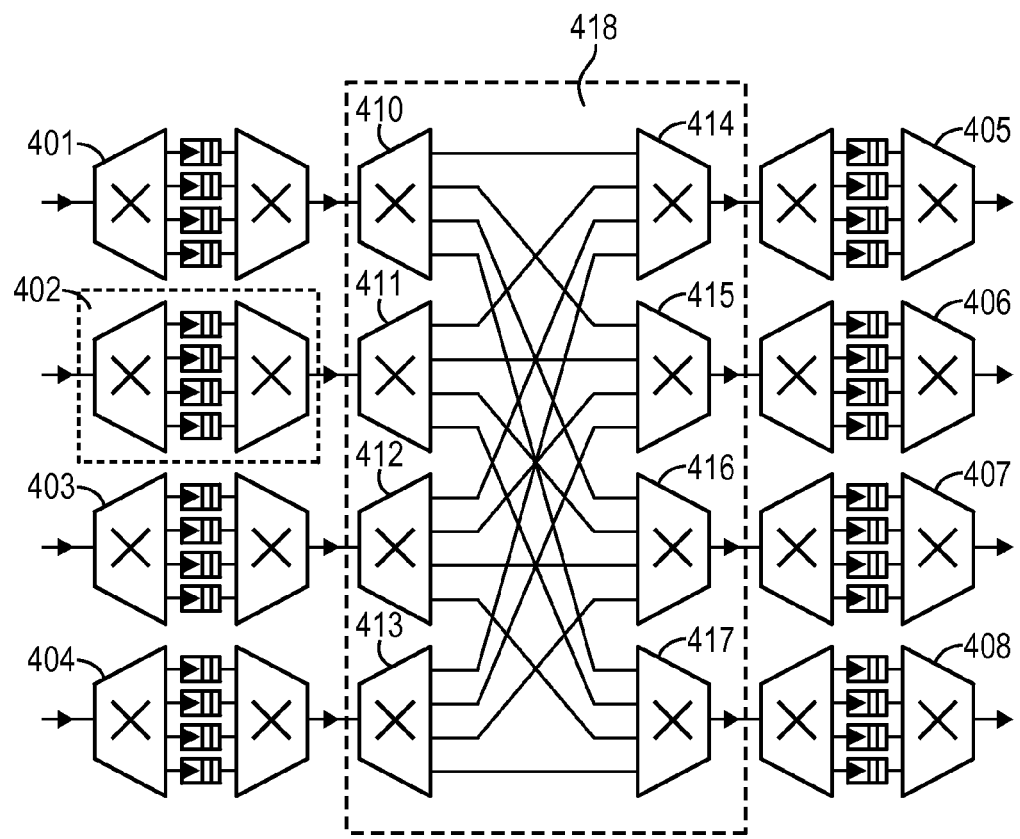
FIG. 28 shows a schematic diagram of a combined input-queued and output-queued crossbar packet switch.

This router structure is shown in FIG. 28 (c.f. FIG. 20, having a different perspective). In FIG. 28, the line cards contain centralised shared memory switches 401-8 of the sectors. Demultiplexers 410-3 of the input sectors and multiplexers 414-7 of the output sectors together with a central transpose interconnection 418 are viewed as forming the central crossbar switch.

To be exactly equivalent to an input-queued crossbar, the links of the transpose operate at the line rate and the crossbar reconfigures each packet timeslot under control of a scheduler. The scheduler is required to solve a bipartite matching problem and is responsible for a severe performance bottleneck where the line rate is high.

Recently, Birkhoff-von Neumann input-queued switches have been introduced. In such devices the traffic matrix, specifying the desired traffic capacity that can be supported between each input-output port, is decomposed into a convex combination of permutations using an algorithm due to Birkhoff-von Neumann. A central crossbar is then successively configured (every time slot) in accordance with each of the permutations with a probability equal to the coefficient of that permutation in the expansion using a packetised weighted fair queuing (WFQ) algorithm. When a particular routing is set up, traffic for that routing is extracted from the input queue and transmitted via the crossbar. Note however, that as the routings are set up using statistical predictions, there will not necessarily be any traffic for the present routing, 100% throughput can be achieved with no-output queuing. However a number of permutations up to the order of the square of the number of ports must be pre-calculated, the WFQ calculations must still be performed on-line, and the internal links of the crossbar must operate at the line rate.

In an embodiment of the present invention, speed-up of the crossbar is exploited to simplify the switch at the expense of requiring input and output queuing as in FIG. 28. Speed-up permits the construction of a service matrix that consists of a sum of permutation matrices that in essence form a rational approximation to the desired traffic matrix. This may be constructed so that each element of the service matrix exceeds the corresponding matrix element of the traffic matrix, thereby guaranteeing 100% throughput at that rate.

Figure 29:
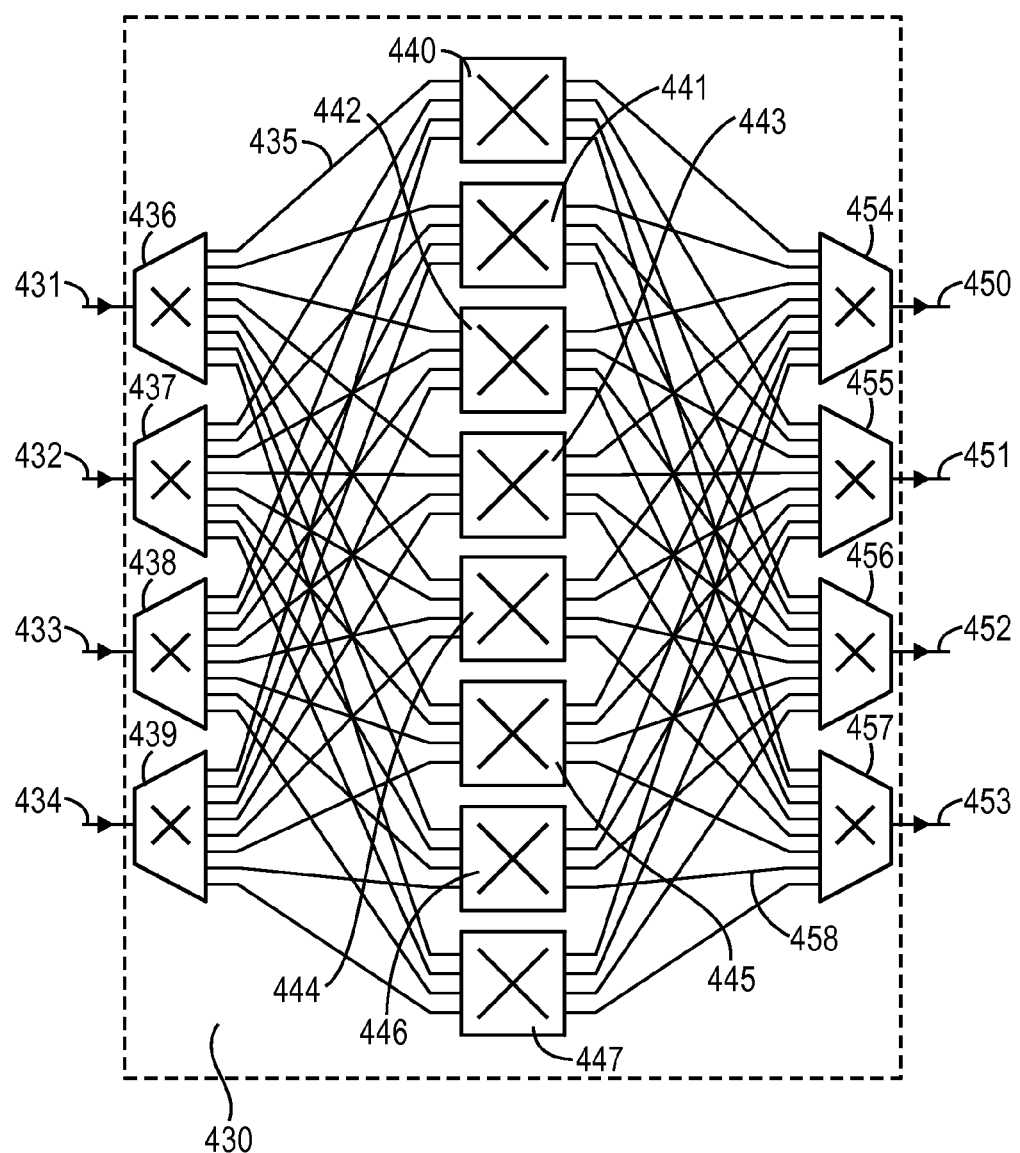
FIG. 29 shows a schematic diagram of temporal multiplexing of permutations by spatial selection of central crossbars.

Referring to FIG. 29, a switch 430 is shown having spatial speed-up, with speed-up k=8. The switch 430 has four inputs 431-4 and four outputs 450-3. The four inputs 431-4 are each fed to a respective eight-output distributor 436-9, and the distributor outputs are fed via a first optical interconnect 435 formed from fibres to eight four-input/four output optical crossbars 440-7. The four outputs 450-3 are provided by the outputs of four eight-input multiplexers 454-7. The inputs of the multiplexers 454-7 are fed from the crossbars 440-7 via a second optical interconnect 458. The first optical interconnect 435 links respective outputs of each demultiplexer to an input of each crossbar, and the second optical interconnect 458 links outputs of each crossbar to each multiplexer. Hence each crossbar receives inputs from each demultiplexer and provides an output to each multiplexer. The crossbars are consecutively and cyclically configured to form eight connection permutations.

The device is Clos-like, and may be considered as a switch that accepts a TDM frame with 8 slots and re-arranges spatially the contents of each time-slot in accordance with the state of each crossbar 440-7.

At the cost of introducing a fixed latency the cyclic switches may be phased, for example by latching the packet data at their optical transmitters, so that packets are received at the output a frame-time after the packets are transmitted to the input. The internal line rate may then be reduced compared to the line rate external to the interconnect (i.e. outside the dashed box shown in FIG. 29) by the number of time slots within the frame. In general for a switch with p crossbars, the reduction will be less compared to the line rate external to the overall packet switch because of the speed-up requirement but it can still be of the order of p/2.

In a preferred embodiment, the crossbars in FIG. 29 are transparent optical cross-connects defining the pre-calculated permutations. Advantageously, the demultiplexers have electrical outputs to VCSELs, and the interconnects use plastic fibres. This is advantageous because the technology and the know-how already exists. Also optoelectronic interfaces are then no more complex than the serialiser-deserialiser (SERDES)/parallel VCSEL links that interface the line cards with the core crossbar switch at speeds up to 30 Gbit/s in conventional designs. It should be borne in mind that switches do not exist in isolation, and that the data input to a switch is likely to have been the subject of multiplexing at an earlier stage. Hence, there may be an "unseen" multiplexer at each input from this earlier stage, and this would with the distributor 436 etc form an identity, so that inputs could in fact be provided direct from their signal sources rather than via mux-transfer-demux stages.

However, by means of the embodiment, the very high-speed power hungry core switch of the prior art is replaced by almost passive optical cross-connects 440-7. Furthermore for a traffic pattern which varies statistically, a scheduling algorithm may be used which operates on the timescale of the traffic variation.

It will of course be clear that optical switching is not critical to the invention. Electrical paths could be used instead.

In line with the teachings of the invention there are provided input-side queues, output side queues and links between them affording speed up. At any one instant the input-side queues, are subject to a fixed permutation—for example due to an instantaneous connection by a multiplexer to a fixedly connected crossbar (at least fixedly connected for the duration of that connection). However, over time the input-side queues are subject to sequential permutations which make up a set of permutations determined from a service matrix that dominates the current traffic matrix. The sequential permutations may be provided by the multiplexer "stepping on" to another, and then another crossbar connection. Alternatively the sequential connections may be provided by causing the crossbars themselves to reconfigure. This second may however be less desirable where crossbar configuration is slow.

Where fixed crossbars are provided, reconfiguration to provide a new set of permutations may be carried out by varying the connections in currently inactive crossbars of the set so that by the time switching steps to those crossbars to make them again active, they provide the new paths. Individual crossbar states may be varied fast, eg up to once per "frame", but much slower variations can give excellent results.

In the embodiment of FIG. 29, packet delays are worse than those of the theoretical optimal maximum weight matching scheduler; however the optimal maximum weight matching scheduler is impractical to implement in any case. The packet delay encountered will be no worse that a Birkhoff-von Neumann switch after the fixed latency due to packet phasing is subtracted.

Note that FIG. 26 is equivalent to FIG. 28 with the central interconnect (dashed box) replaced by FIG. 29 with the addition of input port multiplexers and output port demultiplexers that provide n lower rate ports at a rate of 1/n of the 'line rate' for the architecture shown in FIG. 28. The speed-up is given by k=m/n.

An embodiment of a control system in accordance with an embodiment of the invention is now described:

1. A desired traffic matrix is specified; alternatively it may be estimated from queue state information.

2. A service matrix with integer entries in units of the internal link rate and that has row and column sums equal to m, where m is the number of ports from each input sector and the ports of each output sector, is constructed such that each integer entry exceeds the corresponding entry in the traffic matrix. The matrix is calculated by calculating the nearest integer greater than each entry of the traffic matrix represented in units of the internal line rate and then incrementing the entries with the least excess service rate until the matrix satisfies the row and column sums requirement.

3. The service matrix is then decomposed into its constituent permutations. This is equivalent to a bipartite multi-graph edge colouring problem. The solution is particularly simple to implement when m is a power of two.

In a second embodiment of the control method, control is achieved by an online algorithm in which each crossbar monitors the difference between the target service matrix and the current service matrix less its own current state. Using this information as the weight, the crossbar sets its future state in accordance with the matching found to a maximum weight bipartite matching problem.

It is clear that an all-ones matrix is always present and therefore in a preferred embodiment is implemented using a fixed transposition. The m−1 is then advantageously a power of two in the decomposition.

In a further embodiment, the number of crossbars is increased beyond the minimum number required allowing individual crossbars to be taken off-line while their state is updated. This is done in demand to changes in traffic patterns. Alternatively or additionally, this may be done at some multiple of the frame time. Because updating is off-line, traffic is unaffected by the time taken to update. As known to those skilled in the art, the slow speed of reconfiguration of optical devices has previously been a difficulty: however because the slow speed of reconfiguration does not affect operation, optical technology may be used in this embodiment.

In another optical embodiment, the reconfigurable interconnect is constructed as m optical cross-connects forming rows sandwiched between line cards (sectors) forming columns.

Load Balanced Packet Switches

It will be recalled that balanced traffic is the case where each arriving packet has destination port addresses uniformly distributed over the outputs. A load balanced switch is a device which incorporates means for transforming unbalanced traffic into balanced traffic. Typically it comprises two devices sandwiching a switching stage.

Figure 30:
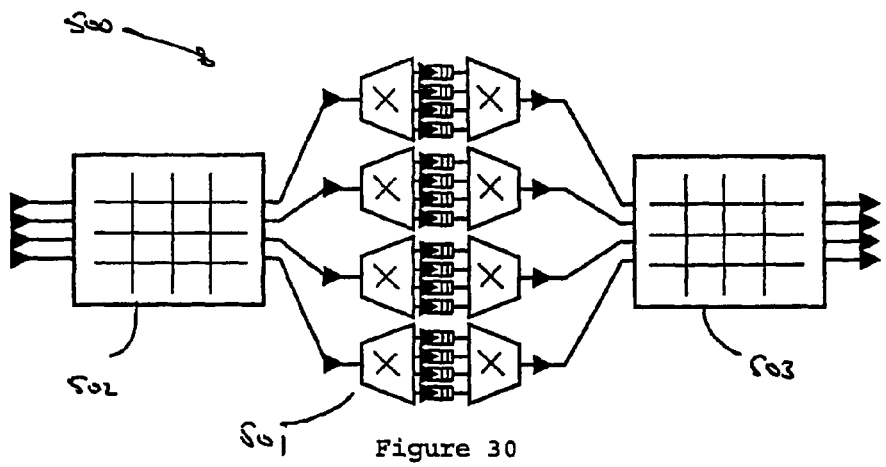
FIG. 30 shows a schematic diagram of a load balanced input-queued crossbar packet switch.

Attention is now directed to FIG. 30, which shows a switch 500 comprising a sectored centralised shared memory switch 501 preceded by a first crossbar 502 and succeeded by a second crossbar 503. The centralised shared memory switch has four sectors. The first crossbar performs a per-time slot cyclic shift to evenly distribute the traffic across the centralised shared memory switching elements, and thus generates balanced traffic. The second crossbar routes the traffic from the shared memory 501.

Figure 31:
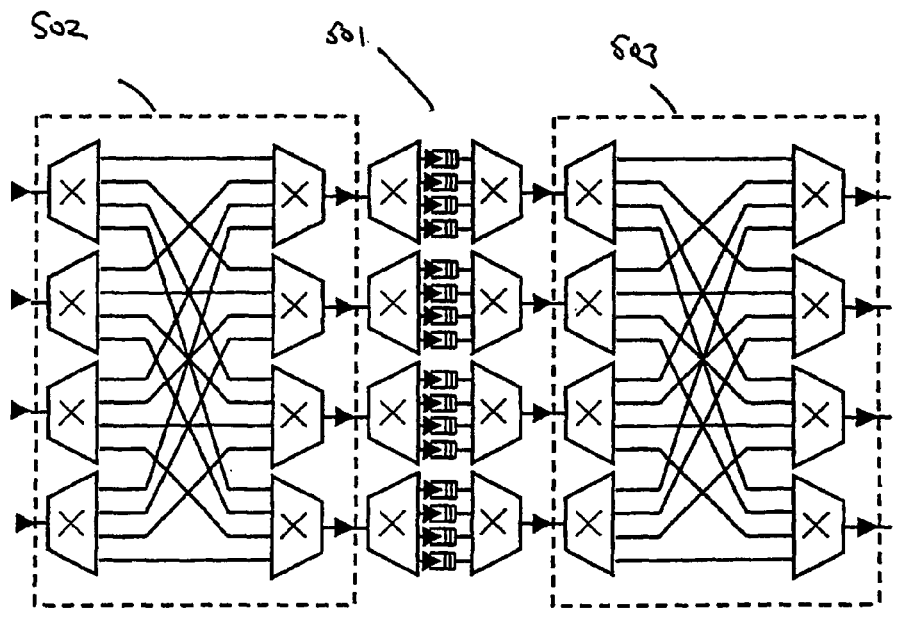
FIG. 31 shows a schematic diagram of a load balanced input-queued crossbar packet switch with crossbars expanded as route and select switches.

For balanced traffic, the Birkhoff-von Neumann decomposition simplifies to a cyclic shift. By using the interconnect from FIG. 29, the spatial interconnect needed to provide the cyclic shift reduces to a fixed transposition. The load balanced Birkhoff-von Neumann switch that results is shown in FIG. 31. FIG. 31 can be derived from FIG. 30 by expanding the crossbar switches as route and select switches. The internal lines that form the transpose interconnections within these route and select switches would normally have to run at the line rate. Load balancing allows the internal line rate to be slower (by a factor of k/N−k is speed-up, N is overall number of input/output ports) than the external line rate, as in FIG. 29.

Figure 32:
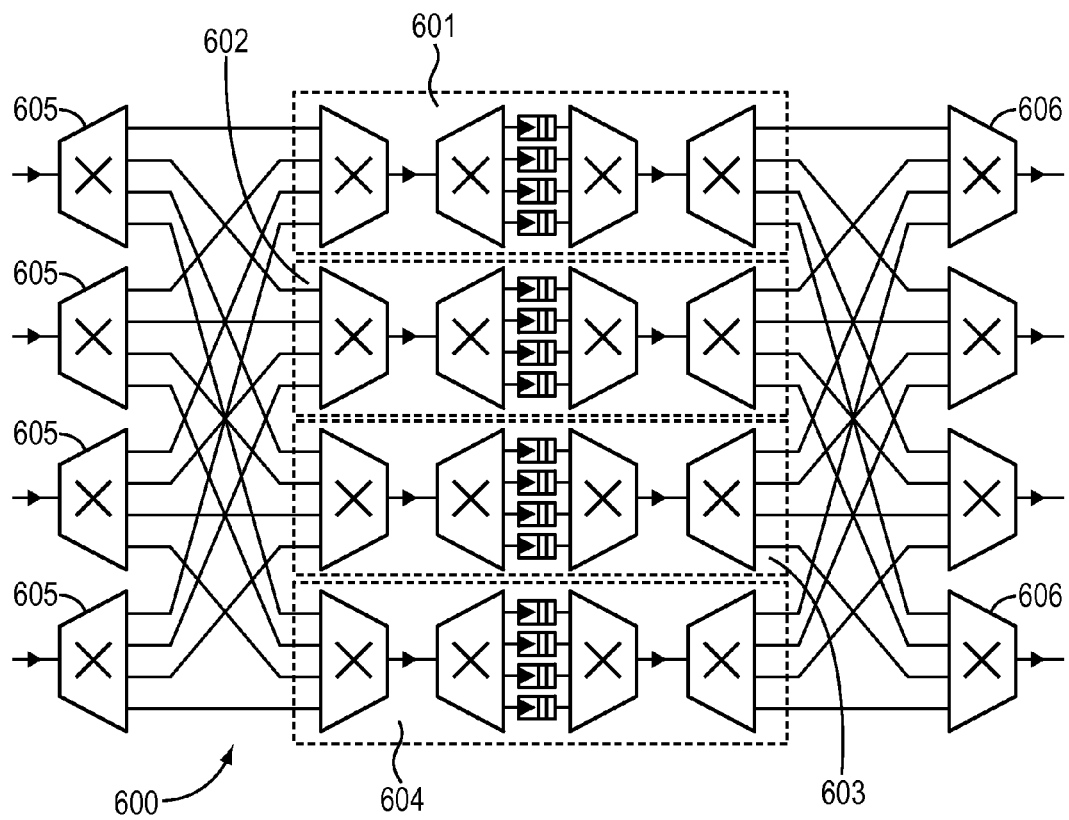
FIG. 32 shows a schematic diagram of a parallel packet switch.

The architecture of FIG. 30 has been described as a two-stage switch. However, FIG. 31 demonstrates that this is a matter of interpretation. It is only necessary to redraw the boundaries from FIG. 31 to achieve the parallel packet switch of FIG. 32. In FIG. 32, the switch device 600 has four multi-port packet switches 601-4 each fed by a four port input switch stage 605 and each feeding a four port output switch stage 606. The multi-port packet switches run slower than the external line-rate. The function of the first stage 605 is to balance the traffic over the packet switches and the function of the output stage 606 is to recombine the outputs of the packet switches.

There are however complications in ensuring that the resultant switch preserves cell sequence and is work conserving (i.e. that an output never idles when there is a packet destined to it within the switch).

The method of control of the Clos-like packet switch described in this invention favours the use of transparent optical technology as the centre stage crossbars are only required to switch at the rate required to adapt to non-stationary traffic and not on a per-packet basis. However, the central stage crossbars could be implemented as electronic TDM memory switches, at the cost of additional optical-to-electronic and electronic-to-optical conversions if the transpose interconnections are optical. As mentioned previously, a centralised shared memory switch is in essence a TDM memory switch with slightly modified control to permit packets to be retained for longer than one TDM frame, in queues within memory. It is therefore possible to use exactly the same centralised shared memory packet switch modules to implement all three stages of the Clos-like packet switch. Depending on the method of control the buffers in each stage may or may not have significant occupancies.

This fully buffered architecture can emulate a wide range of architectures that have previously been considered distinct:

1. The generalised knockout switch results if the first two stages are configured as TDM switches i.e. packets are only queued (beyond a single TDM frame) in the final stage. The first two stages attempt to route packets to the correct output port i.e. normally the last stage acts as a 1:1 connection. Otherwise the packet is routed to the correct sector and is then switched to the correct output port queue. If that is not possible the packet is dropped (knock-out principle). This architecture favours technology that possesses very fast switching in the first two stages and fast reconfiguration in the last stage.

2. The invention here results if the central stage is configured as a TDM switch with queuing in both the first and third stages. The TDM switches are set to provision bandwidth between first stage and final stage sectors according to demand. This is only required on a timescale that characterises the statistical variation of the traffic. This favours technology with fast switching in the first and last stages and much slower reconfiguration in the central stage.

3. The Parallel Packet Switch and Load Balanced Birkhoff-von Neumann switches result if the first and final stages are configured as TDM switches and queuing only takes place in the central stage. The central stages may run slower than the external line rate but intelligent load balancing requires a sophisticated scheduler. This favours technology that possesses very fast switching in the first and last stages and fast switching in the central stage.

4. An input-queued router-select crossbar switch results if the central and final stages are configured as TDM switches and queuing takes place in the first stage. This favours technology that possesses fast switching in all stages but not as fast as required by an output-queued crossbar.

5. A Clos-like network of packet switches results if queuing is performed in all three-stages. Load balancing is then a matter of software determining local routing tables. These need only be updated on timescales that characterise non-stationarity of the traffic. The use of speed-up permits coarser quantisation of the traffic matrix, reducing the complexity of the implicit scheduler. The preservation of the logical structure of the cross-point queues distributed through the three stages ensures that cells are not mis-sequenced. The spatial speed-up permits the central links to run slower than the line rate.

Although in the above description optical interconnects are provided by fibres, the invention extends to other methods of interconnection, and specifically includes the use optical components such as lenses and holographic gratings together, or on their own to provide free space paths.

It should be noted that although the particular example described herein make use of crosspoint queues, here one queue (one half queue) in each input sector for each output port, and one queue (one half queue) in each output sector for each input port, this is not essential to the invention. It would be possible to implement the invention with a single serial queue in each input sector for each output sector, and/or with a single input queue in output sector per output port, providing a suitable queue handling algorithm were implemented.

It facilitates the operation of a switch if variable length packets are segmented into convenient sized cells which can then be handled independently by the switch. Although segments belonging to the same packet will retain the correct sequence in embodiments of a packet switch embodying the invention, they will in some such embodiments be interleaved with segments of other packets destined for the same output port. If it is desired to make each individual switch transparent to variable length packets then segmentation must take place at the input and reassembly must take place at the output ports of each switch. It is then convenient to use full crosspoint queuing (i.e. one VOQ/VIQ queue per input/output port pair) as this facilitates segmentation in the VOQs (as variable length packets are stored as a contiguous block that can be segmented into cells) and re-assembly in the VIQs (where the segments are contiguous)—this would be particularly straightforward if the cell size is a multiple of the memory word size.

Embodiments of the present invention have now been described with particular reference to the examples illustrated. However, it will be appreciated that variations and modifications may be made to the examples described within the scope of the present invention.

The invention claimed is:

1. A packet switch for switching packets, carried in time slots, between traffic sources and traffic sinks, the switch having plural input sectors and output sectors, each input sector being arranged to hold at least one queue per output sector, each input sector having plural input ports, each input port being arranged to receive packets from respective traffic sources, each output sector having plural output ports and being arranged to hold at least one queue per output port, the input sectors being connected to the output sectors via links configured to afford speed-up of data transfer, the links comprising a set of optical links, each optical link being connected to plural optical switches and arranged to carry packets from a respective input sector to any of the plural output sectors, the set of optical links resulting in fixed connections between the input and output sectors according to a traffic matrix that includes elements that specify the time-average required capacity between each traffic source-traffic sink pair, wherein the packet switch includes a circuitry for controlling the plural optical switches to vary the resulting connections of the set of links in accordance with variations in the time-average capacity and not at a time slot rate.

2. A packet switch according to claim 1 wherein each input sector is arranged to hold one queue per output of the output sectors to provide virtual output queuing (VOQ).

3. A packet switch according to claim 1 wherein each input sector is arranged to hold only one queue per output sector.

4. A packet switch having plural input sectors and output sectors,
each input sector having an input sector memory and plural input ports, each port being arranged to receive packet data, carried in time slots, between traffic sources and traffic sinks, the input sector memory being arranged to store plural input queues of packet data from said input ports, at least one said input queue corresponding to each respective output sector, the input sector memory having a respective output for each said input queue,
each output sector having an output sector memory and plural output ports;
the output sector memory being arranged to store plural output queues and having plural inputs for packet data and being arranged to pass packet data to a respective output port, the packet switch further having a switch core and a control device;
wherein said switch core comprises plural optical links for carrying packet data between outputs of the input sector memory and inputs of the output sector memory, and
wherein the control device comprises a processor operable to enable packet data transfer between said outputs and inputs using said optical links to allow transfer of packets according to a traffic matrix with elements that specify the time-average required capacity between each traffic source-traffic sink pair, each optical link being connected to plural optical switches and arranged to carry packets from a respective input sector to any of the plural output sectors, the set of optical links resulting in fixed connections between the input and output sectors according to a traffic matrix having elements relating to a currently existing traffic pattern and the control device being further operable to vary the resulting connection of the set of links in accordance with variations in the time-average capacity and not at a time slot rate.

5. A packet switch as claimed in claim 4, wherein each input sector memory is arranged to store one input queue per input port of the sector for each output port of the switch.

6. A packet switch as claimed in claim 5, wherein each output sector memory is arranged to store one output queue per output port of the sector for each input port of the switch.

7. A packet switch as claimed in claim 6, wherein each output sector memory is arranged to store a single output queue per output port of the sector.

8. A packet switch as claimed in claim 4, wherein each input sector memory is arranged to store a single output queue per output sector for each input port of the switch.

9. A packet switch as claimed in claim 4, wherein each link has a higher packet rate than the line rate of packet flow at switch input ports to provide said speed-up.

10. A packet switch as claimed in claim 4, wherein each link has a similar packet rate to the line rate of packet flow at switch input ports.

11. A packet switch as claimed in claim 4, wherein the processor is further constructed and arranged to construct a service matrix having integer entries in units of the link rate and having row and column sums equal to the number of ports from each input sector and ports of each output sector such that in said units of the internal link rate, each of said integer entries exceeds the corresponding entry in a desired traffic matrix, said matrix having elements formed by the said desired offered load at the switch inputs on the basis of each input and output port; and to decompose the service matrix into its constituent permutations thereby to control said links using said permutations.

12. A method of routing packets transported in time slots between traffic source and traffic sinks using a packet switch having plural input sectors and output sectors, each input sector being arranged to hold at least one queue per output sector, each output sector having plural output ports and being arranged to hold at least one queue per output port, the packet switch being configured to allow transfer of packets according to a traffic matrix with elements that specify the time-average capacity required between each traffic source-traffic sink pair, the method comprising:
providing a set of links for connecting the or each input sector queue to respective output sector queues,
connecting at least some input sector queues to respective output sector queues using a subset of said set of optical links, said subset affording speed-up of data transfer, each optical link being connected to plural optical switches and arranged to carry packets from a respective input sector to any of the plural output sectors, the set of optical links resulting in fixed connections between the input and output sectors according to a traffic matrix with elements relating to a currently existing traffic pattern, and
varying the resulting connections of the set of links in accordance with variations in the time-average capacity and not at a time slot rate.

13. A method according to claim 12, further comprising determining the variations in the time-average capacity.

14. A method according to claim 13, wherein the determining step comprises monitoring input queue states.

15. A method according to claim 13, wherein the determining step comprises monitoring input packet arrivals.

16. A method according to claim 12, wherein the providing step comprises constructing a service matrix having integer entries in units of the internal link rate and having row and column sums equal to the number of ports from each input sector and ports of each output sector such that, in said units of the internal link rate, each of said integer entries exceeds the corresponding entry in a desired traffic matrix, said desired traffic matrix having elements formed by the said desired offered load at the switch input ports on the basis of each input port and output port;
decomposing the service matrix into its constituent permutations and controlling said links using said permutations.

17. A line card interface device for carrying traffic defined by a traffic matrix with elements that specify the time-average capacity required between each traffic source-traffic sink pair, the capacity having a statistical distribution which varies at a given variation rate, the interface device comprising an optical selector and a control device, the optical selector having plural interface inputs for connection to a first multi-path optical connection, plural interface outputs for connection to a second multi-path optical connection, and plural optical paths connecting the interface inputs to the interface outputs, the connections of the plural optical paths being fixed between timeslots and arranged to meet the time-average capacity required between each currently existing traffic source-traffic sink pair, wherein the optical paths allow transfer of more packets per unit time than are incident per unit time at the plural interface inputs, thereby providing speed-up, the optical selector further having plural optical switches, each said optical switch being operable to enable passage of optical data therethrough and to prevent passage of optical data therethrough according to control signals, the speed of response to the control signals being substantially less than said line rate, and the control device having means for applying control signals to the switch control inputs at a rate in accordance with the statistical variations in the time-average capacity and not at a time slot rate.

18. A line card interface according to claim 17, wherein the optical paths are spatially distinct and are greater in number than the number of the plural interface inputs to provide spatial speed-up.

19. A line card interface according to claim 17, wherein the interface inputs and outputs are divided into input groups and output groups, each input group having a distributor, said distributor having one or more of said interface inputs and plural outputs, each output group having a multiplexer having an input, one or more interface outputs, and the optical paths comprise an optical connection wherein each input group is connectable to each output group.

20. A line card interface according to claim 19, wherein the distributor and the multiplexer are electronic.

21. A line card interface according to claim 19, wherein the distributor and the multiplexer are optical.

22. A line card interface according to claim 19, wherein each input group has a respective input group memory, said distributor having plural outputs for writing to said input group memory and each output group has a respective output group memory, said multiplexer input being connected to receive outputs from said output group memory.

23. The line card interface according to claim 19, wherein the optical connection comprises an optical fibre device.

24. A line card interface according to claim 19, wherein the optical connection comprises optical components providing free-space paths in use.

25. A line card interface according to claim 19, wherein each input group has the same number of inputs as the number of outputs of said output groups.

26. A line card interface according to claim 19, wherein each memory is a dual-port memory having an input port for writing to the memory and an output port for reading from the memory.

27. A line card interface according to claim 19, having latching circuitry for storing packet data for input to said interface inputs whereby said multi-path optical connections have a line rate reduced compared to said line rate.

* * * * *